(12) United States Patent
Kiyama et al.

(10) Patent No.: US 12,347,021 B2
(45) Date of Patent: Jul. 1, 2025

(54) INFORMATION PROCESSING DEVICE AND METHOD

(71) Applicant: Sony Group Corporation, Tokyo (JP)

(72) Inventors: Yuka Kiyama, Tokyo (JP); Mitsuhiro Hirabayashi, Tokyo (JP); Ryohei Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 230 days.

(21) Appl. No.: 17/999,566

(22) PCT Filed: May 28, 2021

(86) PCT No.: PCT/JP2021/020439
§ 371 (c)(1),
(2) Date: Nov. 22, 2022

(87) PCT Pub. No.: WO2021/251185
PCT Pub. Date: Dec. 16, 2021

(65) Prior Publication Data
US 2023/0222726 A1 Jul. 13, 2023

Related U.S. Application Data

(60) Provisional application No. 63/037,744, filed on Jun. 11, 2020.

(51) Int. Cl.
*G06T 15/20* (2011.01)
*H04N 21/854* (2011.01)

(52) U.S. Cl.
CPC ....... *G06T 15/20* (2013.01); *H04N 21/85406* (2013.01); *G06T 2210/61* (2013.01)

(58) Field of Classification Search
CPC ................ G06T 15/20; G06T 2210/61; H04N 21/85406
See application file for complete search history.

(56) References Cited

U.S. PATENT DOCUMENTS 9,430,115 B1 * 8/2016 Yun ................. G06F 16/739
2019/0114830 A1 * 4/2019 Bouazizi ............ G06F 3/013

FOREIGN PATENT DOCUMENTS

| CN | 101388988 A | 3/2009 |
| JP | 2020-503792 A | 1/2020 |

(Continued)

OTHER PUBLICATIONS

International Search Report and Written Opinion mailed on Aug. 17, 2021, received for PCT Application PCT/JP2021/020439, filed on May 28, 2021, 9 pages including English Translation.

(Continued)

*Primary Examiner* — Michelle L Sams
(74) *Attorney, Agent, or Firm* — XSENSUS LLP

(57) ABSTRACT

A scene descriptive file describing a scene of 3D object content is generated, in the scene descriptive file, timed metadata identification information indicating that metadata of an associated external file changes in a time direction being stored in an MPEG_media extension, and timed metadata access information associating a camera object with the metadata being stored in the camera object. Furthermore, timed metadata that changes in the time direction is acquired on the basis of the timed metadata identification information and the timed metadata access information stored in the scene descriptive file, and a display image of the 3D object content is generated on the basis of the acquired timed metadata. The present disclosure is applicable to, for example, an information processing device, an information processing method, or the like.

16 Claims, 34 Drawing Sheets

(56) References Cited

FOREIGN PATENT DOCUMENTS

WO   2019/010198 A1   1/2019
WO   WO-2019187434 A1   10/2019

OTHER PUBLICATIONS

"Information Technology—Coding of audio-visual objects—Part 12: ISO base media file format", International Standard, ISO/IEC 14496-12, Fifth edition, Dec. 15, 2015, pp. 1-233.
Kondrad et al., "Technologies under Considerations on Scene Description for MPEG Media ", ISO/IEC JTC1/SC29/WG11 MPEG2020/N19446, Jun./Jul. 2020, 28 pages.
Bhatia et al., "Khronos glTF2.0", Khronos Group, Available Online At: https://github.com/KhronosGroup/glTF/tree/master/specification/2.0, Jun. 9, 2017, 111 pages.
Aoki et al., "(36.1) Proposed extensions of glTF2 for supporting MPEG media", ISO/IEC JTC1/SC29/WG11 MPEG2020/M53397r1, Apr. 2020, 6 pages.
Thomas et al., "MPEG Media Enablers for Richer XR Experiences", IBC 2020, IBC365, Available Online At: https://www.ibc.org/technical-papers/mpegmedia-enablers-for-richer-xr-experiences/6516.article, Sep. 21, 2021, pp. 1-12.

\* cited by examiner

FIG. 3

```
{
 "scenes":[{"name":"Scene 1 ","nodes":[0,1]},
  {"name":"Scene2","nodes":[2]}],
 "nodes":[{"name":"Node1", "mesh":0,"camera":0, skin":0},
  {"name":"Node2", "mesh":1, "camera":1, skin":1},
  {"name","Node3"}],
 "meshs":[{"primitives": [{
  "attributes": {"NORMAL": 23,"POSITION": 22,"TANGENT": 24,"TEXCOORD_0": 25},
  "indices": 21,"material": 3,"mode": 4}]
  …
 }],
 "cameras":[{…}],
 "skins" :[{…}],
 "materials" :[{…}],
 "textures" :[{…}],
  …
 "scene": 0
}
```

```
{
  "meshes": [
    {
      "primitives": [
        {
          "attributes": {
            "NORMAL": 23,
            "POSITION": 22,
            "TANGENT": 24,
            "TEXCOORD_0": 25
          },
          "indices": 21,
          "material": 3,
          "mode": 4
        }
      ]
    }
  ]
}
```

SPECIFY accessor FOR EACH VERTEX ATTRIBUTE

FIG. 7

A
```
"buffers":[
  {
    "byteLength":102040,
    "uri":"duck.bin"
  }
]
```

B
```
"bufferViews":[
  {
    "buffer":0,
    "byteLength":25272,
    "byteOffset":0,
    "target":34963  //ELEMENT_ARRAY_BUFFER
                    (OpenGL MACRO CONSTANT)
  },
  {
    "buffer":0,
    "byteLength":76768,
    "byteOffset":25272,
    "byteStride":32,  //VERTEX ATTRIBUTE DATA
    "target":34962    ARRAY_BUFFER
                      (OpenGL MACRO CONSTANT)
  }
]
```

C
```
"accessors":[
  {
    "bufferView":0,
    "byteOffset":0,
    "componentType":5126,  //FLOAT TYPE (OpenGL MACRO CONSTANT)
    "count":2106,          //2106 PIECES OF data
    "type":"VEC3"          //THREE-DIMENSIONAL VECTOR (data type)
  }
]
```

FIG. 8

```
{
  "extensionsUsed": [ "CompareDataExtension" ]
  "extensionsRequired": ["CompareDataExtension"],
  "nodes": [
    {
      "name": "singleNode"
    }
  ],
  "scenes": [
    {
      "name": "singleScene",
      "nodes": [ 0 ],
      "extensions": {
        "CompareDataExtension": {.....}
      }
    }
  ],
  "scene": 0
}
```

FIG. 10

```
{
  "texture":[{"sampler": 0,"source": 1, "extensions": {" MPEG_video_texture ": "accessor": 2}}],
  "nodes": [{ "name":"singleNode"}],
  "scenes": [{ "name": "singleScene",
       "nodes": [0]}],
  "extensions": {
    "MPEG_media":{
      "media":[
        {"name": "source_1", "renderingRate":30.0, "startTime": 9.0, "timeOffset": 0.0,
         "loop":"true", "controls":"false",
         "alternatives":[{"mimeType":"video/mp4;codecs=\"avc1.42E01E\"", "uri":"video1.mp4",
           "tracks":[{"track":"#track_ID=1"}]
         }]
        }
      ]
    }
  },
  "scene": 0
}
```

FIG. 11

```
{
 "accessors": [{"bufferView": 0,"componentType": 5126,"byteOffset": 0,
                                     "count": 12323,"type": "VEC4",
  "extensions": {
   "MPEG_timed_accessor": {"bufferView":1, "updateRate":25.0, "immutable":1,}
  }
 }],
 "bufferViews":[{"buffer": 0, "byteLength":555000, "name":" circular_buffer"},
                {"buffer": 1, "byteLength": 128,
                 "name":"timed_accesor_information_header_buffer"}],
 "buffers":[{"byteLength": 555000,
  "extensions": {
   "MPEG_circular_buffer": { "count":5, "headerLength":12, "updateRate":25.0}
  }},
  {"byteLength": 128}
 ]
}
```

FIG. 15

| Syntax | Type | Description |
|---|---|---|
| frame_rate | float | The frame_rate field provides the frame frequency per second at which the transformation information is expected to change. |
| frame_number | integer | The frame_number field indicates the frame number the transformation information is provided. |
| camera_position | FLOAT_VEC3 | The camera_position field specifies the position at which the camera is located in the scene. |
| camera_orientation | FLOAT_VEC4 | The camera_orientation field specifies the orientation of camera in the scene. |
| aspectRatio | float | The aspectRatio field indicates the aspect ratio of the field of view. |
| yfov | float | The yfov field indicates vertical field of view in radians. |
| zfar | float | The zfar field indicates distance to the far clipping plane. |
| znear | float | The znear field indicates distance to the near clipping plane. |

FIG. 16

| | | |
|---|---|---|
| STORE timed camera metadata IN timed metadata OUTSIDE scene description | | |
| METHOD 1 | STORE timed metadata IDENTIFICATION INFORMATION IN MPEG_media object<br>STORE timed metadata ACCESS INFORMATION IN extension OF camera object | |
| METHOD 1-1 | ASSOCIATE SINGLE timed camera metadata WITH scene description | |
| METHOD 1-1-1 | SPECIFY timed metadata ACCESS INFORMATION USING 11 DIMENSIONAL VECTOR | |
| METHOD 1-1-2 | SPECIFY timed metadata ACCESS INFORMATION USING VECTOR ARRAY | |
| METHOD 1-2 | ALLOW PLURALITY OF PIECES OF timed camera metadata TO BE ASSOCIATED WITH scene description | |
| METHOD 1-2-1 | SPECIFY PLURALITY OF MPEG_media objects USING timed metadata ACCESS INFORMATION | |
| METHOD 1-2-2 | CAUSE MPEG_media object TO STORE PLURALITY OF PIECES OF camera metadata | |

FIG. 18

```
"extensions": {
    "MPEG_media": {
        media: [
            {
                "name": "timed_camera_data1",
                ...
                "alternatives": [{
                    "mimeType": "application/mp4;codecs=\"campY\"",
                    "uri": "timedcamera1.mp4",
                    "tracks": [ {"track": "#track=1"} ]
                }]
            }
        ]
    }
}
```

FIG. 19

```
"cameras":[{
  "name": "Finite perspective camera",
  "type": "perspective",
  "perspective": {
    "aspectRatio": 1.5,
    "yfov": 0.660593,
    "zfar": 100,
    "znear": 0.01
  },
  "extensions": {
    "MPEG_timed_camera": {
      "name": "RECOMMENDED VIEW1",
      "POSITION": 0,      // SPECIFY accessorID  FLOAT_VEC3
      "ORIENTATION": 1,   // FLOAT_VEC4
      "PARSPECTIVE": 2    // FLOAT_VEC4
    }
  }
}]
```

FIG. 20

| Name | Type | Default | Description |
|---|---|---|---|
| name | String | N/A | Label of timed camera. |
| POSITION | Number | N/A | Provides a reference to accessor where the timed data for camera position will be made available. |
| ORIENTATION | Number | N/A | Provides a reference to accessor where the timed data for camera orientation will be made available. |
| PERSPECTIVE | Number | N/A | Provides a reference to accessor where the timed data for camera perspective will be made available. |

FIG. 21

```
{
    "accessors": {
        {
            bufferView": 0,"componentType": 5126, "byteOffset": 0,"count": 1,"type": "VEC3",
            "extensions": {
                "MPEG_timed_accessor": {bufferView":1,"updateRate":25.0, "immutable":0,"}
            }
        },
        {
            bufferView": 0,"componentType": 5126, "byteOffset":12,"count": 1,"type": "VEC4",
            "extensions": {
                "MPEG_timed_accessor": {bufferView":2,"updateRate":25.0, "immutable":0,"}
            }
        },
        {
            bufferView": 0,"componentType": 5126, "byteOffset": 28,"count": 1,"type": "VEC4",
            "extensions": {
                "MPEG_timed_accessor": {bufferView":3,"updateRate":25.0, "immutable":0,"}
            }
        },
    },
    "bufferView" : [{
        "buffer": 0, "byteOffset":0, "byteLength":97, "name":"sample data bufferview"
    }]
}
```

141, 142, 143

A

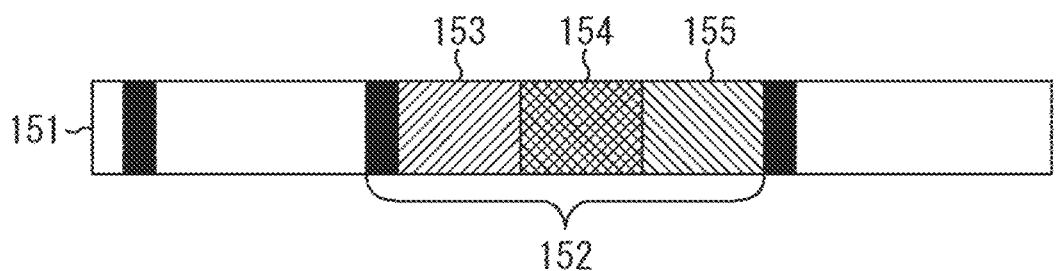

B

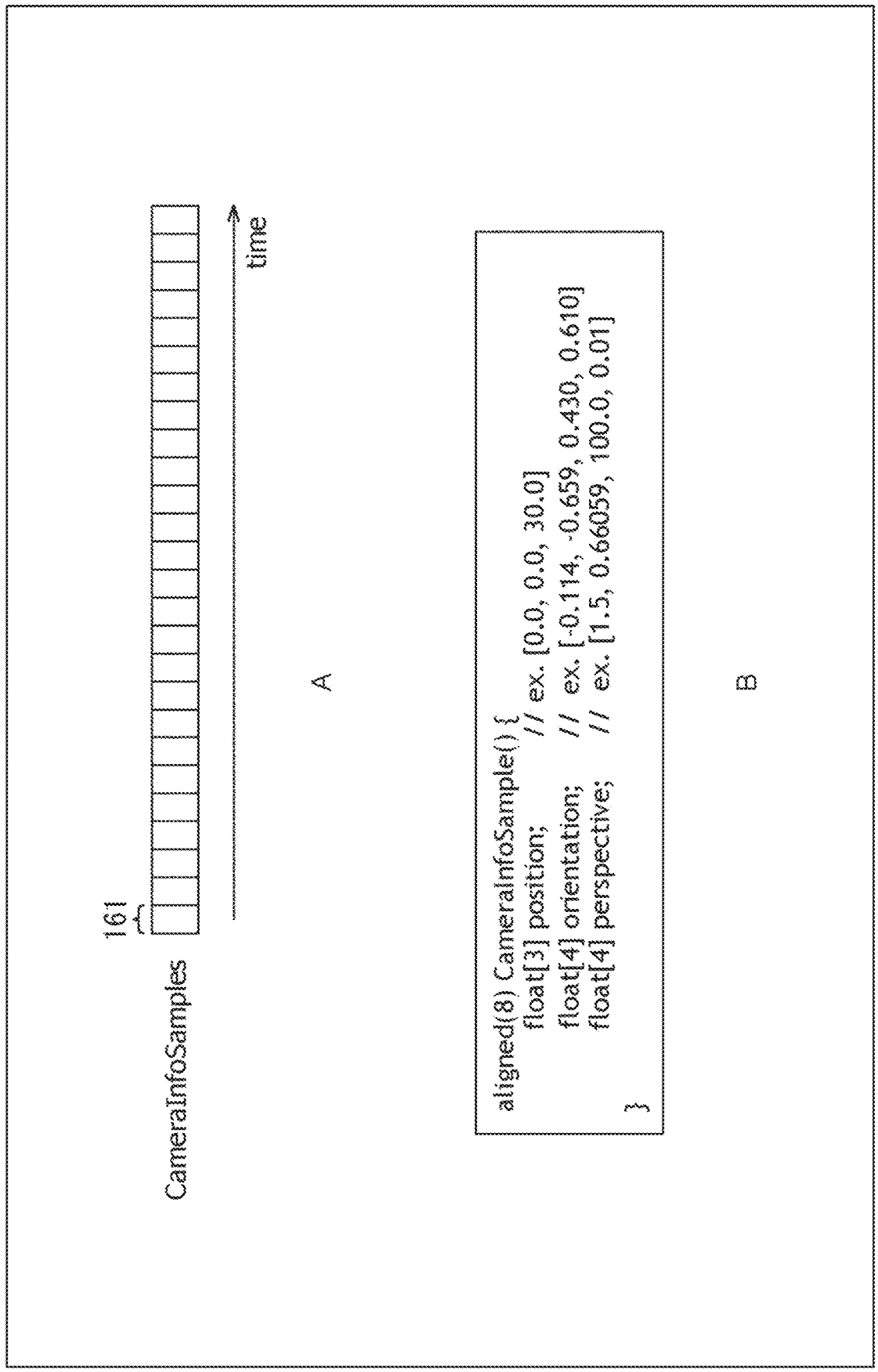

FIG. 23

```
"cameras" :[{
    "name": "Finite perspective camera",
    "type": "perspective",
    "perspective": {
        "aspectRatio": 1.5,
        "yfov": 0.660593,
        "zfar": 100,
        "znear": 0.01
    },
    "extensions": {
        "MPEG_timed_camera":{
            "name": "RECOMMENDED VIEW1",
            "SAMPLEDATA": 0,
        }
    }
}],
accessors": [{
    "bufferView": 0,
    "byteOffset": 0,
    "componentType": 5126,   // FLOAT TYPE (OpenGL MACRO CONSTANT)
    "count": 1    ,          // ONE PIECE OF data
    "type": "VEC3"           // THREE-DIMENSIONAL VECTOR (data type)
    "extensions": {
        "MPEG_type":{   //EXTEND type OF accessor
            "type":"VEC11"}
    }
}]
```

A

| Name | Type | Default | Description |
|---|---|---|---|
| name | String | N/A | Label of timed camera. |
| SAMPLEDATA | Number | N/A | Provides a reference to accessor where the timed data for all camera properties will be made available. |

```
"cameras" :[{
    "name": "Finite perspective camera",
    "type": "perspective",
    "perspective": {
        "aspectRatio": 1.5,
        "yfov": 0.660593,
        "zfar": 100,
        "znear": 0.01
    },
    "extensions": {
        "MPEG_timed_camera":{
            "name": "RECOMMENDED VIEW1",
            "SAMPLEDATA": 0,
        }
    }
}],
accessors": [{
    "bufferView": 0,
    "byteOffset": 0,
    "componentType": 5126,   // FLOAT TYPE (OpenGL MACRO CONSTANT)
    "count": 1     ,         // ONE PIECE OF data
    "type": "VEC3"           // THREE-DIMENSIONAL VECTOR (data type)
    "extensions": {
        "MPEG_accessor_type":{   //EXTEND type OF accessor
            "type":["VEC3", "VEC4", "VEC4"]
        }
}]
```

A

| Name | Type | Default | Description |
|---|---|---|---|
| name | String | N/A | Label of timed camera. |
| SAMPLEDATA | Number | N/A | Provides a reference to accessor where the timed data for all camera properties will be made available. |

```
"cameras" :[{
    "name": "Finite perspective camera",
    "type": "perspective",
    "perspective": {
        "aspectRatio": 1.5,
        "yfov": 0.660593,
        "zfar": 100,
        "znear": 0.01
    },
    "extensions": {
        "MPEG_timed_camera":[{   // FIRST MPEG_timed_camera object
            "name": "RECOMMENDED VIEW1",
            "POSITION": 22,    // SPECIFY accessorID  FLOAT_VEC3
            "ORENTATION": 23,  // FLOAT_VEC4
            "PARSPECTIVE": 24, // FLOAT_VEC4
        },
        {                      // SECOND MPEG_timed_camera object
            "name": "RECOMMENDED VIEW2",
            "POSITION": 26,    // SPECIFY accessorID  FLOAT_VEC3
            "ORENTATION": 27,  // FLOAT_VEC4
            "PARSPECTIVE": 28, // FLOAT_VEC4
        }]
    }
}]
```

A

```
"extensions": {
    "MPEG_media": {
        media: [
            {
                "name": "timed_camera_data1",
                    :
                "alternatives": [
                    {
                        "mimeType": "application/mp4;codecs=\"campY\"",
                        "url": "timedcamera1.mp4",
                        "tracks": [ {"track": "#track=1"} ]
                    }
                ]
            },
            {
                "name": "timed_camera_data2",
                    :
                "alternatives": [
                    {
                        "mimeType": "application/mp4;codecs=\"campY\"",
                        "url": "timedcamera2.mp4",
                        "tracks": [ {"track": "#track=1"} ]
                    }
                ]
            },
```

221 { (first media block)
222 { (second media block)

```
"cameras" :[{
    "name": "Finite perspective camera",
    "type": "perspective",
    "perspective": {
        "aspectRatio": 1.5,
        "yfov": 0.660593,
        "zfar": 100,
        "znear": 0.01
    },
    "extensions": {
        "MPEG_timed_camera":{
            "name": "RECOMMENDED VIEW",
            "POSITION": 22,    // SPECIFY accessorID  FLOAT_VEC3
            "ORENTATION": 23,   // FLOAT_VEC4
            "PARSPECTIVE": 24,   // FLOAT_VEC4
        }
    }
}]
```

A

```
"extensions": {
    "MPEG_media": {
        media: [
            {
                "name": "timed_camera_data",
                :
                "alternatives": [
                    {
                        "name":"for_artistA_View"
                        "mimeType": "application/mp4;codecs=¥"camp¥"",
                        "uri": "timedcamera1.mp4",
                        "tracks": [{"track": "#track=1"}]
                    }
                    {
                        "name":"for_artistB_View"
                        "mimeType": "application/mp4;codecs=¥"camp¥"",
                        "uri": "timedcamera2.mp4",
                        "tracks": [{"track": "#track=1"}]
                    }
                ]
            }
        ]
    }
}
```

231 { (first alternative block)
232 { (second alternative block)

B

INFORMATION PROCESSING DEVICE AND METHOD

CROSS-REFERENCE TO RELATED APPLICATIONS

The present application is based on PCT filing PCT/JP2021/020439, filed May 28, 2021, which claims priority to U.S. Provisional Patent Application No. 63/037,744, filed Jun. 11, 2020, the entire contents of each are incorporated herein by reference.

TECHNICAL FIELD

The present disclosure relates to an information processing device and method, and more particularly, to an information processing device and method capable of suppressing an increase in load of a reproduction process.

BACKGROUND ART

Conventionally, known is The GL Transmission Format (glTF) (registered trademark) 2.0 that is a format for arranging a three-dimensional (3D) object in a three-dimensional space (for example, see Non-Patent Document 1). In recent years, in Moving Picture Experts Group (MPEG)-I Scene Description, a study to extend glTF2.0 and apply content that changes in a time direction has been conducted (for example, see Non-Patent Document 2). For example, there has been proposed a method of handling timed texture media that is coded and stored as texture (Texture) data in International Organization for Standardization Base Media File Format (ISOBMFF) or the like (for example, see Non-Patent Document 3). Moreover, a study about a method of handling objects that change with time not only for content but also for metadata associated with the content has been conducted (see, for example, Non-Patent Document 4).

CITATION LIST

Non-Patent Document

Non-Patent Document 1: Saurabh Bhatia, Patrick Cozzi, Alexey Knyazev, Tony Parisi, "Khronos glTF2.0", https://github.com/KhronosGroup/glTF/tree/master/specification/2.0, Jun. 9, 2017
Non-Patent Document 2: Lukasz Kondrad, Imed Bouazizi, "Technologies under Considerations on Scene Description for MPEG Media", ISO/IEC JTC1/SC29/WG11 MPEG2020/N19290, April 2020
Non-Patent Document 3: "Information technology. Coding of audio-visual objects. Part 12", ISO/IEC 14496-12, 2015-02-20
Non-Patent Document 4: Shuichi Aoki and Yuma Wakahara, "(36.1) Proposed extensions of glTF2 for supporting MPEG media", ISO/IEC JTC1/SC29/WG11 MPEG2020/M53397r1, April 2020

SUMMARY OF THE INVENTION

Problems to be Solved by the Invention

However, in conventional methods, in a case where metadata that changes with time is handled in a scene description, all the metadata that changes with time is described in the scene description. In order to reproduce 3D object content, the metadata that changes with time and another timed media have different synchronization mechanisms, and thus need to be synchronized with each other. Therefore, complicated work is required, and there has been a possibility that a load of a reproduction process of the 3D object content increases.

The present disclosure has been made in view of such circumstances, and it is therefore an object of the present disclosure to suppress an increase in load of a reproduction process.

Solutions to Problems

An information processing device according to one aspect of the present technology includes a file generation unit configured to generate a scene descriptive file describing a scene of 3D object content, in which in the scene descriptive file, timed metadata identification information indicating that metadata of an associated external file changes in a time direction is stored in an MPEG_media extension, and timed metadata access information associating a camera object with the metadata is stored in the camera object.

An information processing method according to one aspect of the present technology includes generating a scene descriptive file describing a scene of 3D object content, in which in the scene descriptive file, timed metadata identification information indicating that metadata of an associated external file changes in a time direction is stored in an MPEG_media extension, and timed metadata access information associating a camera object with the metadata is stored in the camera object.

An information processing device according to another aspect of the present technology includes an acquisition unit configured to acquire timed metadata that changes in a time direction on the basis of timed metadata identification information stored in an MPEG_media extension in a scene descriptive file describing a scene of 3D object content and timed metadata access information stored in a camera object in the scene descriptive file, and a generation unit configured to generate a display image of the 3D object content on the basis of the timed metadata acquired by the acquisition unit.

An information processing method according to another aspect of the present technology includes acquiring timed metadata that changes in a time direction on the basis of timed metadata identification information stored in an MPEG_media extension in a scene descriptive file describing a scene of 3D object content and timed metadata access information stored in a camera object in the scene descriptive file, and generating a display image of the 3D object content on the basis of the timed metadata acquired.

In the information processing device and method according to one aspect of the present technology, a scene descriptive file describing a scene of 3D object content is generated, in the scene descriptive file, timed metadata identification information indicating that metadata of an associated external file changes in a time direction being stored in an MPEG_media extension, and timed metadata access information associating a camera object with the metadata being stored in the camera object.

In the information processing device and method according to another aspect of the present technology, timed metadata that changes in a time direction is acquired on the basis of timed metadata identification information stored in an MPEG_media extension in a scene descriptive file describing a scene of 3D object content and timed metadata access information stored in a camera object in the scene descriptive file, and a display image of the 3D object content is generated on the basis of the acquired timed metadata.

BRIEF DESCRIPTION OF DRAWINGS

FIG. 3 is a diagram illustrating a description example of a JSON format file.

FIG. 5 is a diagram illustrating a description example of a JSON format file.

FIG. 7 is a diagram illustrating description examples of a buffer object, a buffer view object, and an accessor object.

FIG. 8 is a diagram for describing how to extend glTF2.0.

FIG. 10 is a diagram for describing extensions for handling Timed media.

FIG. 11 is a diagram for describing extensions for handling Timed media.

FIG. 15 is a diagram illustrating an example of a camera object that changes with time.

FIG. 16 is a diagram for describing how to transmit timed metadata.

FIG. 18 is a diagram illustrating a description example of an MPEG_media object in a scene description.

FIG. 19 is a diagram illustrating a description example of camera extensions in a scene description.

FIG. 20 is a diagram illustrating an example of semantics of parameters applied in camera extensions.

FIG. 21 is a diagram illustrating an example of how to access timed metadata via an accessor object.

FIG. 22 is a diagram illustrating an example of timed metadata.

FIG. 23 is a diagram illustrating a description example of camera extensions in a scene description.

FIG. 24 is a diagram illustrating a description example of camera extensions in a scene description.

FIG. 26 is a diagram illustrating an example where a plurality of pieces of timed metadata is associated with a scene description.

FIG. 27 is a diagram illustrating an example where a plurality of pieces of timed metadata is associated with a scene description.

MODE FOR CARRYING OUT THE INVENTION

Hereinafter, modes for carrying out the present disclosure (hereinafter, referred to as embodiments) will be described. Note that the description will be given in the following order.
1. MPEG-I Scene Description
2. Transmission of timed metadata and the like
3. First embodiment (file generation device)
4. Second embodiment (client device)
5. Appendix 1. MPEG-I Scene Description <Documents and the Like Supporting Technical Contents and Technical Terminology>

The scope disclosed in the present technology includes not only the contents described in the embodiments but also the contents described in the following Non-Patent Documents and the like publicly known at the time of filing, the contents of other documents referenced in the following Non-Patent Documents, and the like.
Non-Patent Document 1: (described above)
Non-Patent Document 2: (described above)
Non-Patent Document 3: (described above)
Non-Patent Document 4: (described above)

That is, the contents described in the above-described Non-Patent Documents, the contents of the other documents referenced in the above-described Non-Patent Documents, and the like also constitute grounds for determining the support requirement.

<gltf2.0>

Figure 1:
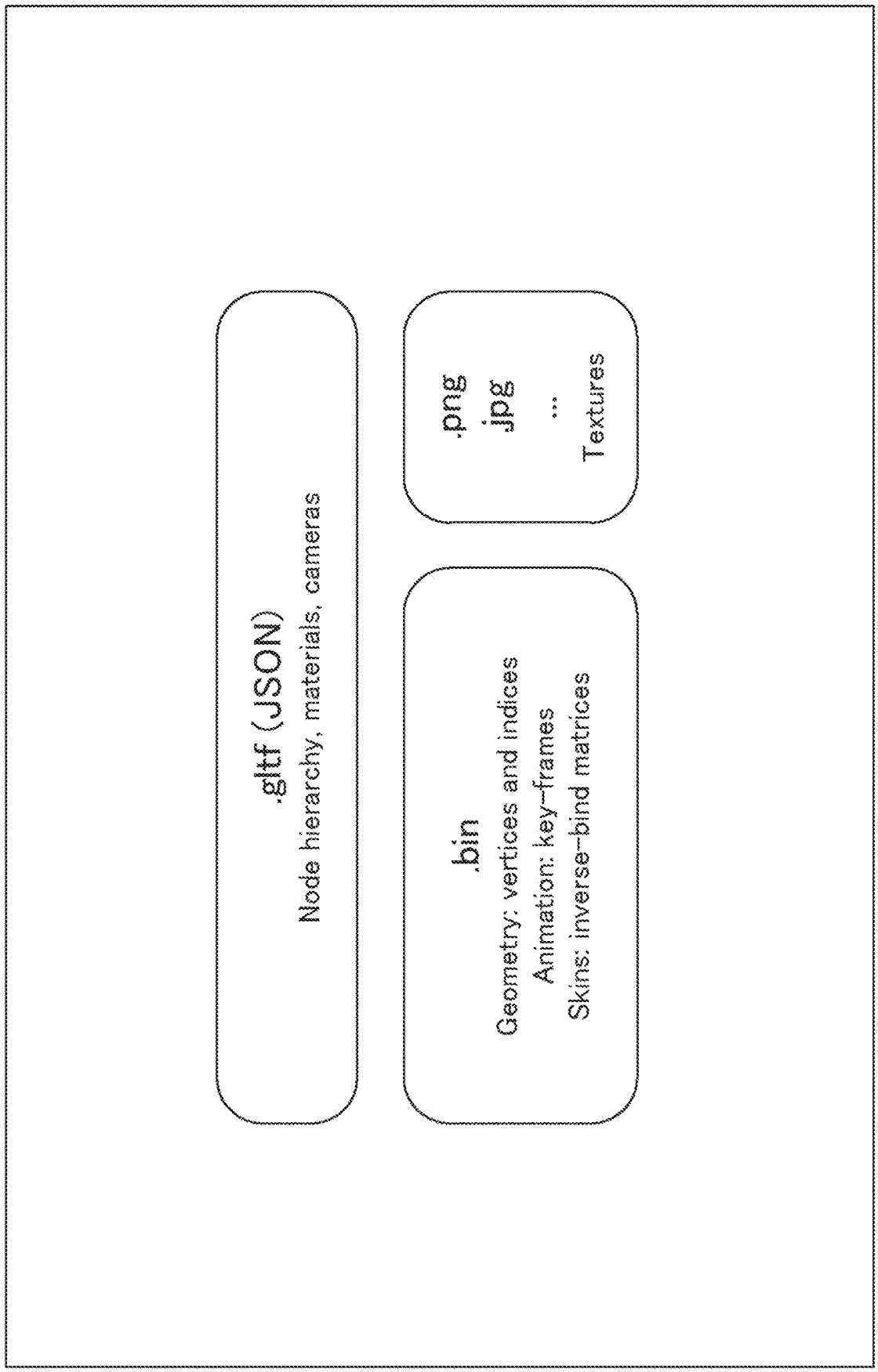
FIG. 1 is a diagram illustrating a main configuration example of a glTF2.0.

Conventionally, for example, as described in Non-Patent Document 1, there is known The GL Transmission Format (glTF) (registered trademark) 2.0 that is a format for arranging a three-dimensional (3D) object in a three-dimensional space. For example, as illustrated in FIG. 1, glTF2.0 includes a JSON format file (.glTF), a binary file (.bin), and an image file (.png, .jpg, or the like). The binary file stores binary data such as geometry or an animation. The image file stores data such as textures.

The JSON format file is a scene description file described in JavaScript (registered trademark) Object Notation (JSON). The scene description is metadata describing (a description of) a scene of 3D content. The description of the scene description defines what kind of scene it is. The scene description file is a file that stores such a scene description. In the present disclosure, the scene description file is also referred to as a scene descriptive file.

The description of the JSON format file includes a list of pairs of a key (KEY) and a value (VALUE). An example of the format will be described below.

"KEY":"VALUE"

The key includes a string. The value includes a numerical value, a string, a Boolean, an array, an object, null, or the like.

Furthermore, a plurality of pairs of keys and values ("KEY":"VALUE") can be put together using { } (curly brackets). The pairs of keys and values put together in curly brackets are also referred to as a JSON object. An example of the format will be described below.

"user":{"id":1, "name":"tanaka"}

In this example, a JSON object in which a pair of "id":1 and a pair of "name":"tanaka" are put together is defined as a value corresponding to a key (user).

Furthermore, zero or more values can be arrayed using [ ] (square brackets). This array is also referred to as a JSON array. For example, a JSON object is applicable as an element of this JSON array. An example of the format will be described below.

"test":["hoge", "fuga", "bar"]

"users":[{"id":1, "name":"tanaka"}, {"id":2, "name":"yamada"}, {"id":3, "name":"sato"}]

Figure 2:
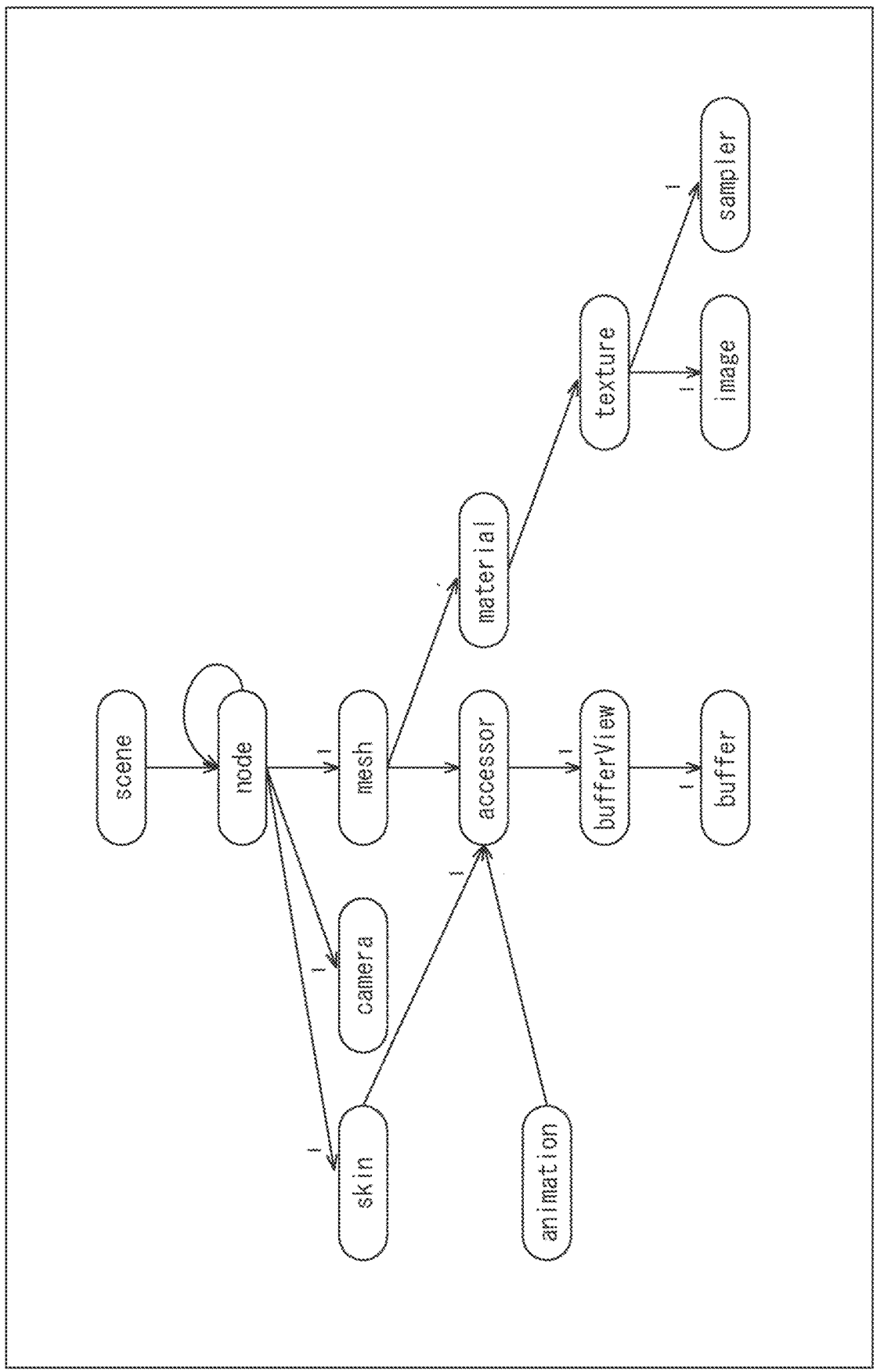
FIG. 2 is a diagram illustrating an example of a glTF object and a reference relation.

FIG. 2 illustrates glTF objects that can be described at the top level of the JSON format file and reference relations that the glTF objects can have. Ellipses in a tree structure illustrated in FIG. 2 indicate objects, and arrows between the objects indicate reference relations. As illustrated in FIG. 2, objects such as "scene", "node", "mesh", "camera", "skin", "material", and "texture" are described at the top level of the JSON format file.

FIG. 3 illustrates a description example of such a JSON format file (scene description). A JSON format file 20 of FIG. 3 illustrates a description example of a part of the top level. In this JSON format file 20, top-level objects 21 to be used are all described at the top level. The top-level objects 21 are the glTF objects illustrated in FIG. 2. Furthermore, the JSON format file 20 illustrates a reference relation between objects as indicated by an arrow 22. More specifically, the reference relation is indicated by specifying an index of an element of an object array to be referenced using a property of the higher-level object.

Figure 4:
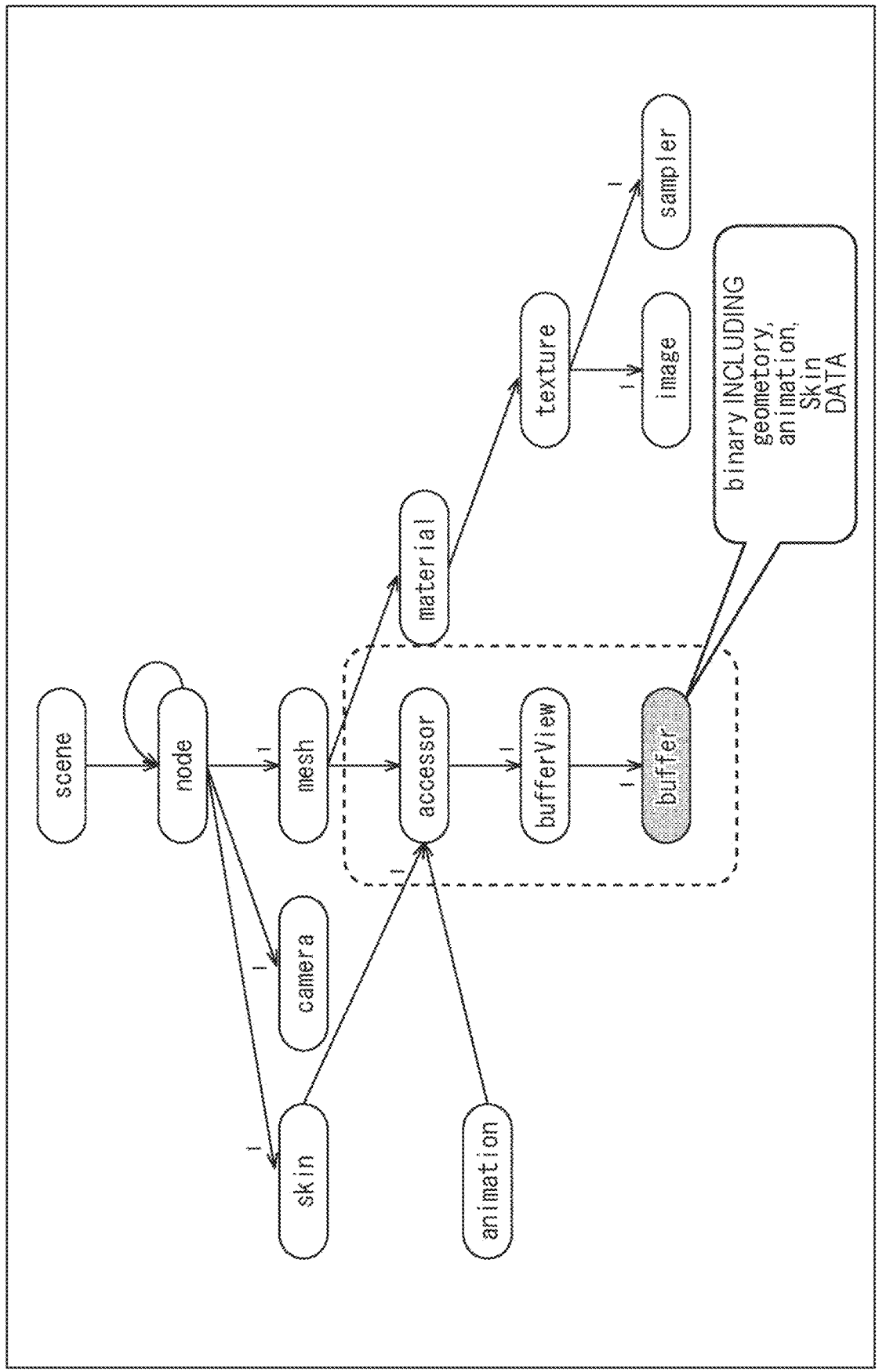
FIG. 4 is a diagram for describing how to access binary data.

FIG. 4 is a diagram for describing how to access binary data. As illustrated in FIG. 4, the binary data is stored in a buffer object. That is, information (for example, a uniform resource identifier (URI) or the like) for accessing the binary data in the buffer object is illustrated. In the JSON format file, as illustrated in FIG. 4, for example, access from objects such as a mesh, a camera, and a skin can be made to the buffer object via an accessor object and a buffer view object (bufferView object).

That is, in objects such as a mesh, a camera, and a skin, an accessor object to be referenced is specified. FIG. 5 illustrates a description example of a mesh object (mesh) in the JSON format file. For example, as illustrated in FIG. 5, in the mesh object, vertex attributes such as NORMAL, POSITION, TANGENT, and TEXCORD_0 are defined as keys, and an accessor object to be referenced is specified as a value for each attribute.

Figure 6:
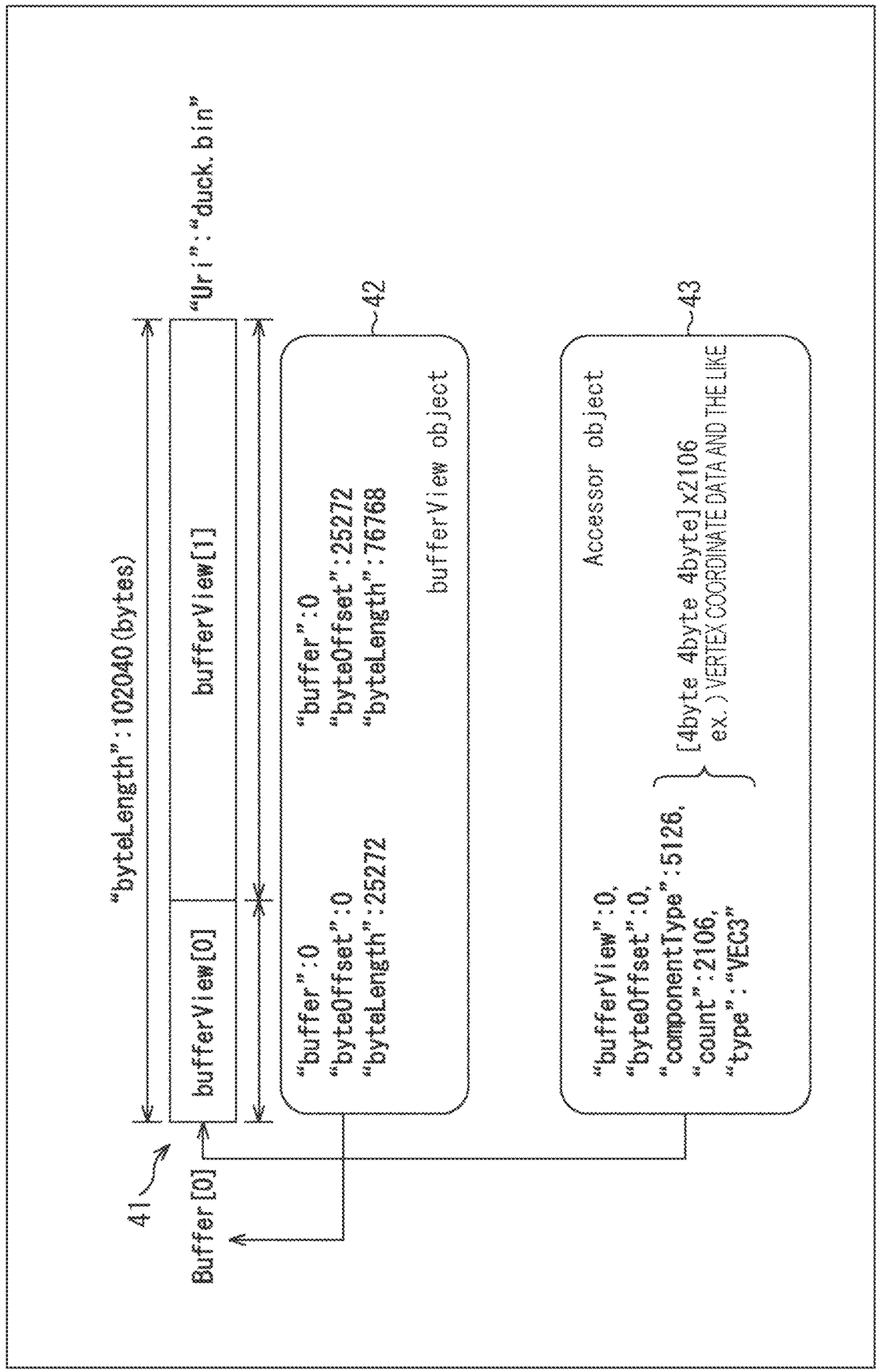
FIG. 6 is a diagram illustrating a relation among a buffer object, a buffer view object, and an accessor object.

FIG. 6 illustrates a relation among a buffer object, a buffer view object, and an accessor object. Furthermore, FIG. 7 illustrates description examples of such objects in the JSON format file.

In FIG. 6, a buffer object 41 is an object that stores information (such as URI) for accessing binary data that is actual data, and information indicating a data length (for example, byte length) of the binary data. A of FIG. 7 illustrates a description example of the buffer object 41. ""bytelength":102040" illustrated in A of FIG. 7 indicates that the byte length of the buffer object 41 is 102040 bytes, as illustrated in FIG. 6. Furthermore, ""uri":"duck.bin"" illustrated in A of FIG. 7 indicates that the URI of the buffer object 41 is "duck.bin", as illustrated in FIG. 6.

In FIG. 6, a buffer view object 42 is an object that stores information regarding a subset area of the binary data specified in the buffer object 41 (that is, information regarding an area of a part of the buffer object 41). B of FIG. 7 illustrates a description example of the buffer view object 42. As illustrated in FIG. 6 and B of FIG. 7, the buffer view object 42 stores, for example, information such as identification information of the buffer object 41 to which the buffer view object 42 belongs, an offset (for example, a byte offset) indicating a position of the buffer view object 42 in the buffer object 41, and a length (for example, a byte length) indicating a data length (for example, a byte length) of the buffer view object 42.

As illustrated in B of FIG. 7, in a case where there is a plurality of buffer view objects, information is described for each of the buffer view objects (that is, for each subset area). For example, information such as ""buffer":0", ""bytelength":25272", and ""byteOffset":0" illustrated on the upper side of B of FIG. 7 is information of the first buffer view object 42 (bufferView[0]) illustrated in the buffer object 41 in FIG. 6. Furthermore, information such as ""buffer":0", ""bytelength":76768", and ""byteOffset":25272" illustrated on the lower side of B of FIG. 7 is information of the second buffer view object 42 (bufferView[1]) illustrated in the buffer object 41 in FIG. 6.

""buffer":0" of the first buffer view object 42 (bufferView[0]) illustrated in B of FIG. 7 indicates that the identification information of the buffer object 41 to which the buffer view object 42 (bufferView[0]) belongs is "0" (Buffer[0]), as illustrated in FIG. 6. Furthermore, ""bytelength":25272" indicates that the byte length of the buffer view object 42 (bufferView[0]) is 25272 bytes. Moreover, ""byteOffset":0" indicates that the byte offset of the buffer view object 42 (bufferView[0]) is zero bytes.

""buffer":0" of the second buffer view object 42 (bufferView[1]) illustrated in B of FIG. 7 indicates that the identification information of the buffer object 41 to which the buffer view object 42 (bufferView[0]) belongs is "0" (Buffer[0]), as illustrated in FIG. 6. Furthermore, ""bytelength":76768" indicates that the byte length of the buffer view object 42 (bufferView[0]) is 76768 bytes. Moreover, ""byteOffset":25272" indicates that the byte offset of the buffer view object 42 (bufferView[0]) is 25272 bytes.

In FIG. 6, an accessor object 43 is an object that stores information regarding how to interpret data of the buffer view object 42. C of FIG. 7 illustrates a description example of the accessor object 43. As illustrated in FIG. 6 and C of FIG. 7, the accessor object 43 stores, for example, information such as identification information of the buffer view object 42 to which the accessor object 43 belongs, an offset (for example, byte offset) indicating a position of the buffer view object 42 in the buffer object 41, a component type of the buffer view object 42, a number of pieces of data stored in the buffer view object 42, and a type of data stored in the buffer view object 42. Such information is described for each buffer view object.

In the example of C of FIG. 7, information such as ""bufferView":0", ""byteOffset":0", ""componentType":5126", ""count":2106", and ""type":"VEC3"" is illustrated. ""bufferView":0" indicates that the identification information of the buffer view object 42 to which the accessor object 43 belongs is "0" (bufferView[0]), as illustrated in FIG. 6. Furthermore, ""byteOffset":0" indicates that the byte offset of the buffer view object 42 (bufferView[0]) is zero bytes. Moreover, "componentType":5126" indicates that the component type is FLOAT type (OpenGL macro constant). Furthermore, ""count":2106" indicates that the number of pieces of data stored in the buffer view object 42 (bufferView[0]) is 2106. Moreover, ""type":"VEC3"" indicates that (the type of) the data stored in the buffer view object 42 (bufferView[0]) is a three-dimensional vector.

All access to data other than images is defined by reference to the accessor object 43 (by specifying an index of the accessor).

In glTF2.0, an object may be extended, and a newly defined object may be stored in the extension object. FIG. 8 is a diagram for describing how to extend glTF2.0. A description example illustrated in FIG. 8 is a description example in a case where a newly defined object (CompareDataExtension) is stored in an extension object of a scene object. In the example illustrated in FIG. 8, the new object (CompareDataExtension) is stored in the extension object (extensions) of the scene object ("scenes"). In a case where an object is extended as described above, a name of the new object is defined in "extensionUsed" and "extensionRequired". This indicates that the new object is an object required for load.

<Application of Timed Media>

In recent years, as disclosed in Non-Patent Document 2, for example, in Moving Picture Experts Group (MPEG)-I Scene Description, a study to extend glTF2.0 and apply timed media (Timed media) as 3D object content has been conducted. The timed media is media data that changes in a time-axis direction like a moving image in a two-dimensional image.

glTF has been applicable only to still image data as media data (3D object content). That is, glTF has not supported media data of a moving image. In a case of moving a 3D object, animation (a method of switching still images along a time axis) has been applied.

In the MPEG-I Scene Description, a study to apply glTF2.0, apply the JSON format file as a scene description, and further extend glTF so as to allow timed media (for example, video data) to be handled as media data has been conducted. In order to handle timed media, for example, the following extensions are made.

Figure 9:
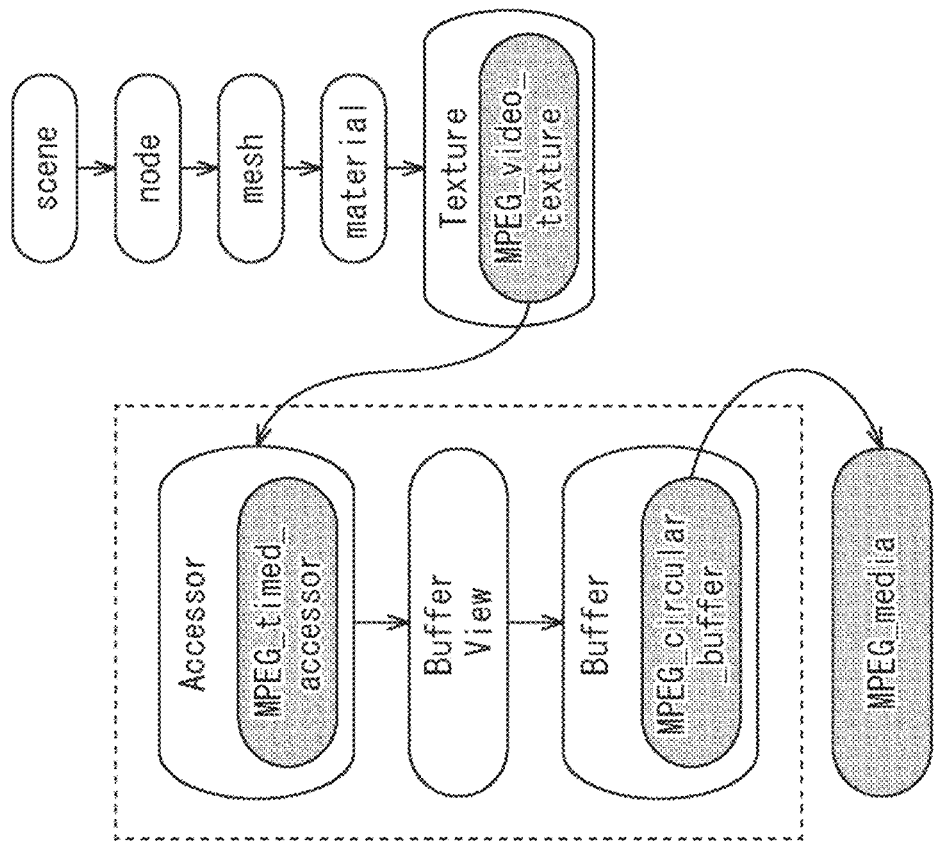
FIG. 9 is a diagram for describing extensions for handling Timed media.

FIG. 9 is a diagram for describing extensions for handling timed media. As illustrated in FIG. 9, an MPEG media object (MPEG_media) that manages actual data such as video data is provided as an extension object (extensions) of a glTF object. That is, information regarding actual data such as video data is stored in the MPEG media object.

Furthermore, as illustrated in FIG. 9, an MPEG video texture object (MPEG_video_texture) is provided as the extension object (extensions) of a texture object (texture). In the MPEG video texture object, information of an accessor corresponding to a buffer object to be accessed is stored. That is, information of an accessor corresponding to a buffer object in which texture media specified by the MPEG media object (MPEG_media) is decoded and stored is stored in the MPEG video texture object.

FIG. 10 is a diagram illustrating description examples of the MPEG media object (MPEG_media) and the MPEG video texture object (MPEG_video_texture) in a scene description for describing extensions for handling timed media. In a case of the example of FIG. 10, in the second line from the top, the MPEG video texture object (MPEG_video_ texture) is set as an extension object (extensions) of a texture object (texture) as follows. Then, as a value of the MPEG video texture object, an index of an accessor ("2" in this example) is specified.
"texture":[{"sampler":0, "source":1, "extensions": {"MPEG_video_texture":"accessor":2}}], Furthermore, in a case of the example of FIG. 10, in the seventh to sixteenth lines from the top, the MPEG media object (MPEG_media) is set as an extension object (extensions) of glTF as follows. Then, as a value of the MPEG media object, for example, various types of information regarding the MPEG media object such as a codec and a URI of the MPEG media object are stored.

```
"MPEG_media":{
    "media":[
        {"name":"source_1", "renderingRate":30.0,
    "startTime":9.0, "timeOffset":0.0,
            "loop":"true", "controls":"false",
            "alternatives":
    [{"mimeType":"video/mp4;codecs=¥"avc1.42E01E¥"",
    "uri":"video1.mp4",
    "tracks":[{"track":""#track_ID=1"}]
            }]
        }
    ]
}
```

Furthermore, as illustrated in FIG. 9, an MPEG circular buffer object (MPEG_circular_buffer) is provided as an extension object (extensions) of a buffer object (buffer). Information for dynamically storing data in the buffer object is stored in the MPEG circular buffer object. For example, information such as information indicating a data length of a buffer header (bufferHeader) and information indicating a number of frames is stored in the MPEG circular buffer object. Note that the buffer header stores, for example, information such as an index, a time stamp, and a data length of stored frame data, and the like.

Furthermore, as illustrated in FIG. 9, an MPEG timed accessor object (MPEG_timed_accessor) is provided as an extension object (extensions) of an accessor object (accessor). In this case, since the media data is a moving image, the buffer view object (bufferView) to be referenced may change in the time direction (the position may vary). Therefore, information indicating the buffer view object to be referenced is stored in the MPEG timed accessor object. For example, the MPEG timed accessor object stores information indicating a reference to a buffer view object (bufferView) describing a timed accessor information header (timedAccessor information header). Note that the timed accessor information header is, for example, header information that stores information in the dynamically changing accessor object and buffer view object.

FIG. 11 is a diagram illustrating description examples of the MPEG circular buffer object (MPEG_circular_buffer) and the MPEG timed accessor object (MPEG_timed_accessor) in the scene description for describing extensions for handling timed media. In a case of the example of FIG. 11, in the fifth line from the top, the MPEG timed accessor object (MPEG_timed_accessor) is set as an extension object (extensions) of an accessor object (accessors) as follows. Then, as a value of the MPEG timed accessor object, parameters such as an index of a buffer view object ("1" in this example), an update rate (updataRate), and immutable information (immutable), and values of the parameters are specified.
"MPEG_timed_accessor":{"bufferView":1, "updateRate": 25.0, "immutable":1,"}

Furthermore, in a case of the example of FIG. 11, in the thirteenth line from the top, the MPEG circular buffer object (MPEG_circular_buffer) is set as an extension object (extensions) of a buffer object (buffer) as follows. Then, as a value of the MPEG circular buffer object, parameters such as a buffer frame count (count), a header length (headerLength), and an update rate (updataRate), and values of the parameters are specified.

"MPEG_circular_buffer":{"count":5, "headerLength":12, "updateRate":25.0}

Figure 12:
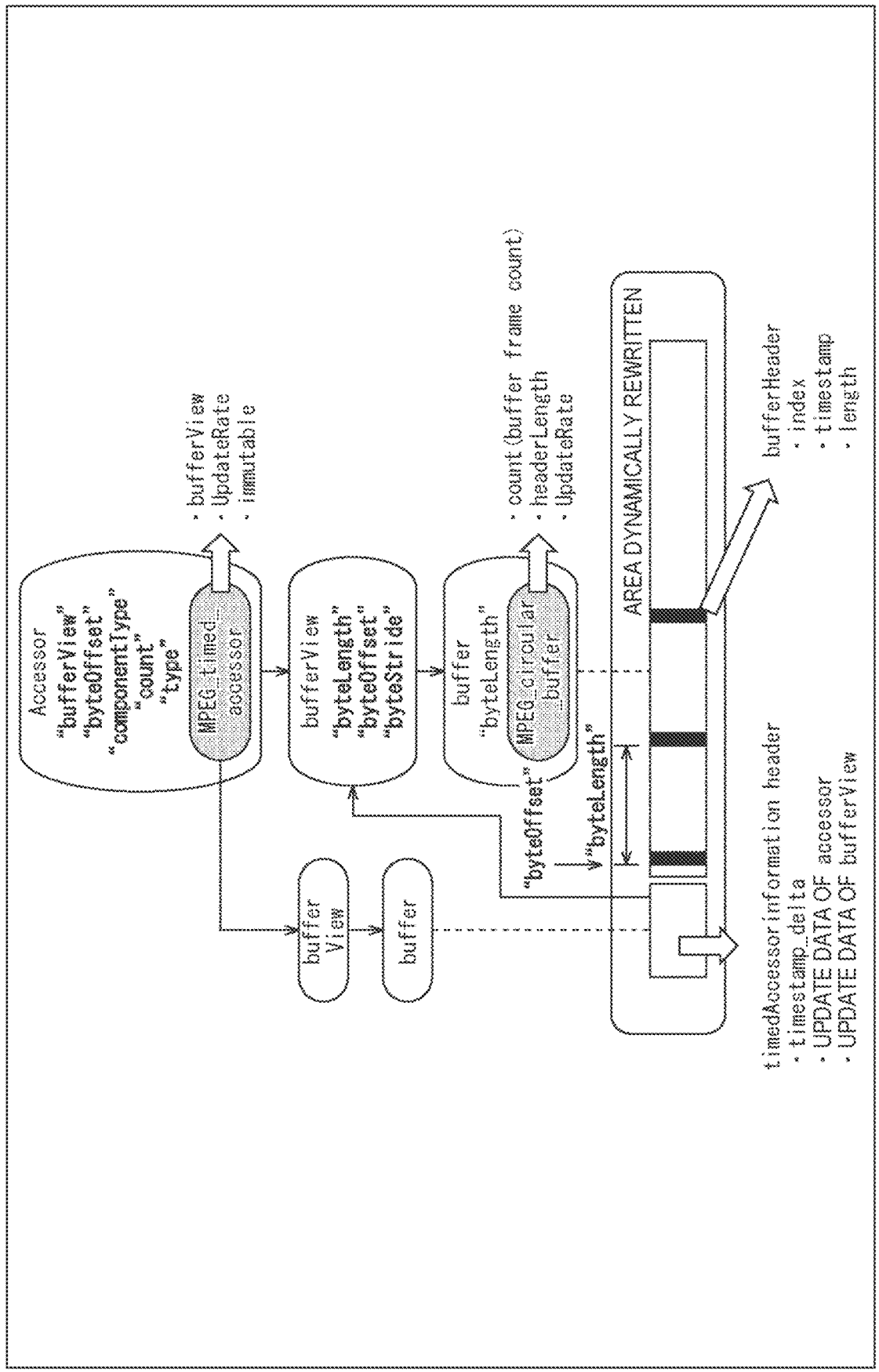
FIG. 12 is a diagram for describing extensions for handling Timed media.

FIG. 12 is a diagram for describing extensions for handling timed media. FIG. 12 illustrates an example of a relation between the MPEG timed accessor object or the MPEG circular buffer object, and the accessor object, the buffer view object, and the buffer object.

As described above, the MPEG buffer object of the buffer object stores information necessary for storing data that changes with time in a buffer area indicated by the buffer object, such as the buffer frame count (count), the header length (headerLength), and the update rate (updataRate). Furthermore, parameters such as an index (idex), a time stamp (timestamp), and a data length (length) are stored in a buffer header (bufferHeader) that is a header of the buffer area.

As described above, the MPEG timed accessor object of the accessor object stores information regarding the buffer view object to be referenced, such as the index of the buffer view object (bufferView), the update rate (updataRate), and the immutable information (immutable). Furthermore, the MPEG timed accessor object stores information regarding the buffer view object in which the timed accessor information header to be referenced is stored. In the timed accessor information header, a time stamp delta (timestamp_delta), update data of the accessor object, update data of the buffer view object, and the like may be stored.

Figure 13:
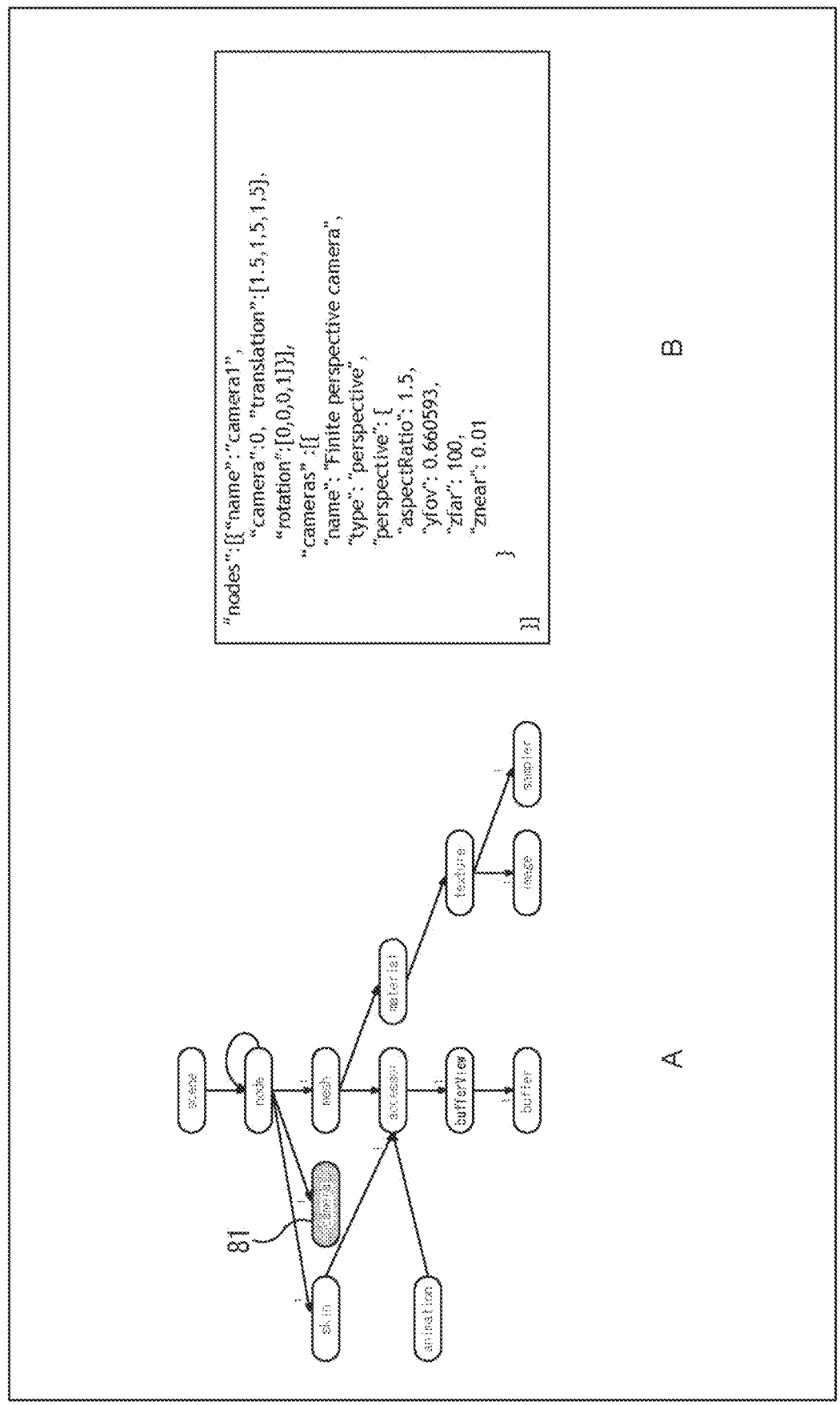
FIG. 13 is a diagram for describing a camera object.

<Camera Object> glTF2.0 includes a camera object (Camera object) as an object. The camera object is an object for clipping a part of a three-dimensional space and displaying the clipped part in a two-dimensional image, and stores an angle of view, perspective information, and the like. As illustrated in A of FIG. 13, a camera object 81 is associated with a node object (node). Therefore, information stored in a property of the node object is applied to a position or an orientation in the space. B of FIG. 13 illustrates an example of the property of the node object.

<Signal of Camera Object that Changes with Time>

Non-Patent Document 4 has proposed changing a position, orientation, angle of view information, and the like of a camera object with time. This allows a content creator to specify how to show a three-dimensional space that changes with time. As a method of realizing the above, for example, as illustrated in A of FIG. 14, a method of defining an extension 82 in the camera object 81 and describing a parameter that changes with time in the extension 82 has been devised.

Figure 14:
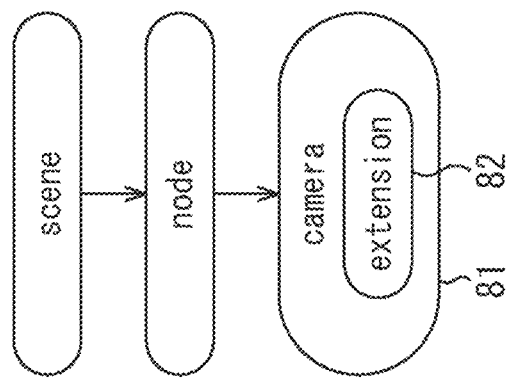
FIG. 14 is a diagram illustrating an example of a camera object that changes with time.

B of FIG. 14 illustrates a description example of the camera object 81 in the scene description in that case. As illustrated in B of FIG. 14, in that case, an MPEG timed camera object (MPEG_timed_camera) that changes in the time direction is set in the extension 82 of the camera object 81, and changes in the time direction of various parameters regarding the camera are represented in the MPEG timed camera object.

In this MPEG timed camera object, for example, values of parameters (for example, frame_rate, frame_number, camera_position, camera_orientation, aspectRatio, yfov, zfar, znear, and the like) as illustrated in FIG. 15 are described. The frame_rate is a parameter indicating a frame rate of the camera. The frame_number is a parameter indicating a frame number of the camera. The camera_position is a parameter indicating a position of the camera. The camera_orientation is a parameter indicating an orientation of the camera. The aspectRatio is a parameter indicating an aspect ratio of the camera. The yfov is a parameter indicating a viewing angle (radian) in a vertical direction. The zfar is a parameter indicating a distance from the camera to a far clipping plane. The znear is a parameter indicating a distance from the camera to a near clipping plane.

<Complication of Process>

In a case where metadata that changes in the time direction, such as information of a camera object whose parameter value changes in the time direction, is handled in a scene description, there is a possibility that a method of writing all the metadata in the scene description as described above causes the process to be complicated.

For example, metadata that is described in such a scene description and changes in the time direction, and other timed media that is stored in an external file of the scene description and changes in the time direction have different synchronization mechanisms. Therefore, in order to reproduce 3D object content, it is necessary to synchronize the metadata and the other timed media. That is, there has been a possibility that a reproduction process becomes complicated, and a load of the reproduction process increases.

Furthermore, in a case of editing metadata (for example, the MPEG timed camera object described above) that is described in the scene description and changes in the time direction, it is necessary to read all the metadata and perform a process as editing of all the metadata even in a case of editing a part of the metadata. That is, there has been a possibility that the editing process becomes complicated, and a load of the editing process increases.

<2. Transmission of Timed Metadata and the Like>

Therefore, as illustrated in the uppermost row of the table of FIG. 16, metadata that changes with time is stored in timed metadata that is data different from the scene description. In the present disclosure, timed metadata regarding a camera is also referred to as timed camera metadata.

With this configuration, the timed metadata is similar in configuration to the other timed media, and the timed metadata is further similar in synchronization mechanism to the other timed media. It is therefore possible to easily synchronize, only by acquiring the information of the timed metadata and the information of the corresponding other timed media at the same timing, the timed metadata and the other timed media. It is therefore possible to prevent the reproduction process from being complicated and suppress an increase in the load of the reproduction process.

Furthermore, since the timed metadata is configured as an external file of the scene description, only a part of the timed metadata can be easily edited. That is, it is possible to prevent the editing process from being complicated and suppress an increase in the load of the editing process.

<Method 1>

In order to associate such timed metadata configured as the external file of the scene descriptive file with the scene descriptive file, timed metadata identification information that is identification information indicating the timed metadata (metadata that changes in the time direction) may be stored in the MPEG media object (MPEG_media object) as illustrated in the second row from the top of the table of FIG. 16 (method 1). Furthermore, timed metadata access information that is information for accessing the timed metadata may be stored in the extension of the camera object (method 1).

For example, under an information processing method, a scene descriptive file describing a scene of 3D object content is generated, in the scene descriptive file, timed metadata identification information indicating that the metadata of the associated external file changes in the time direction being stored in the MPEG media object (MPEG_media extension), and timed metadata access information that associates the camera object with the metadata being stored in the camera object.

For example, an information processing device includes a file generation unit that generates a scene descriptive file describing a scene of 3D object content, in the scene descriptive file, timed metadata identification information indicating that the metadata of the associated external file changes in the time direction being stored in the MPEG media object (MPEG_media extension), and timed metadata access information that associates the camera object with the metadata being stored in the camera object.

For example, under the information processing method, timed metadata that changes in the time direction is acquired on the basis of timed media identification information (timed metadata identification information) stored in the MPEG media object (MPEG_media extension) in a scene descriptive file describing a scene of 3D object content and timed media access information (timed metadata access information) stored in the camera object in the scene descriptive file, and a display image of the 3D object content is generated on the basis of the acquired timed metadata.

For example, the information processing device includes an acquisition unit that acquires timed metadata that changes in the time direction on the basis of timed media identification information (timed metadata identification information) stored in the MPEG media object (MPEG_media extension) in a scene descriptive file describing a scene of 3D object content and timed media access information (timed metadata access information) stored in the camera object in the scene descriptive file, and a generation unit that generates a display image of the 3D object content on the basis of the timed metadata acquired by the acquisition unit.

With this configuration, the timed metadata can be associated with the scene description. Therefore, the device that reproduces the 3D object content can easily access the timed metadata on the basis of the timed metadata identification information and the timed metadata access information. Therefore, as described above, the device that reproduces the 3D object content can prevent the reproduction process and the editing process from being complicated and suppress an increase in the load of such processes.

Figure 17:
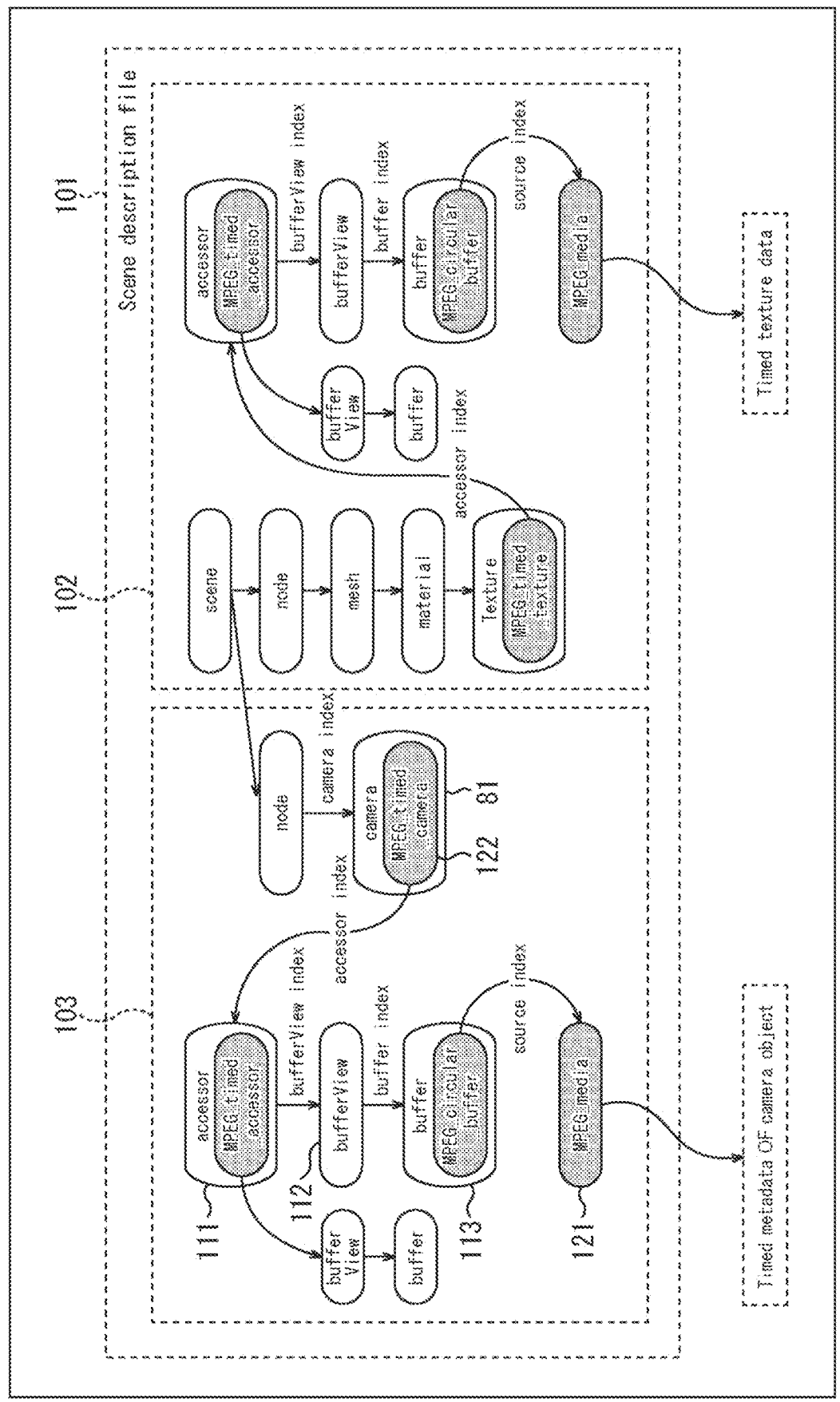
FIG. 17 is a diagram for describing how to associate a camera object that changes with time.

FIG. 17 is a diagram for describing how to associate a camera object that changes with time. As illustrated in FIG. 17, a scene descriptive file 101 has a configuration as illustrated in a dotted frame of FIG. 17. As described above with reference to FIG. 9 and the like, the texture object can access the MPEG media object (that is, the timed texture data outside the scene descriptive file) via the accessor object, the buffer view object, and the buffer object as illustrated in a practical frame 102.

As with the above case, the camera object 81 can access an MPEG media object 121 (that is, the timed metadata outside the scene descriptive file) via an accessor object 111, a buffer view object 112, and a buffer object 113 as illustrated in a practical frame 103.

At this time, information of the external file is stored in the MPEG media object (MPEG_media object) for associating the scene descriptive file with the external file. Timed media identification information is stored in the MPEG media object (MPEG_media). The timed media identification information is identification information indicating that the information of the external file (or a track in the file) is the timed metadata of the camera object (camera).

For example, this timed media identification information may be stored in a mimeType of an alternatives array of the MPEG media object (MPEG_media extension) in the scene descriptive file. Then, when the 3D object content is reproduced, the timed metadata may be acquired on the basis of the timed media identification information stored in the mimeType of the alternatives array of the MPEG media object (MPEG_media extension) in the scene descriptive file.

FIG. 18 is a diagram illustrating a description example of the MPEG media object (MPEG_media extension) in the scene descriptive file. As illustrated in the eighth line from the top in FIG. 18, a sample entry (sampleEntry) (for example, 'camp') of a timed metadata track is set as codecs in the mimeType of the alternatives array. Note that the type indicating the timed metadata is arbitrarily determined and is not limited to the above-described example (camp). A recommended view point (recommended view port) (where metadata is stored) defined in MPEG-I part 10 is used as the timed metadata of the camera object, so that the type of the sample entry indicating the recommended view port is stored, thereby indicating how to interpret data.

Furthermore, as illustrated in FIG. 17, in order to indirectly (in the order of the accessor object (accessor) 111, the buffer view object (bufferView) 112, the buffer object (buffer) 113, and the MPEG media object (MPEG_media) 121) associate the camera object 81 with the timed metadata, an MPEG timed camera object (MPEG_timed_camera) 122 is defined in the camera object 81, and an index of the accessor object 111 to the buffer object 113 in which the timed metadata is stored is referenced in the MPEG timed camera object (MPEG_timed_camera) 122.

That is, the timed metadata access information may be stored in the MPEG timed camera object (MPEG_timed_camera extension) of the camera object in the scene descriptive file. Then, when the 3D object content is reproduced, the timed metadata may be acquired on the basis of the timed metadata access information stored in the MPEG timed camera object (MPEG_timed_camera extension) of the camera object in the scene descriptive file.

FIG. 19 is a diagram illustrating a description example of the camera object (cameras) in the scene descriptive file. As illustrated in the eleventh to sixteenth lines from the top of FIG. 19, the MPEG timed camera object 122 is defined.

As illustrated in FIG. 19, a plurality of parameters may be set in the timed metadata access information, and an accessor object corresponding to an area of a buffer object to be referenced may be specified using an index of the accessor for each of the parameters. Then, when the 3D object content is reproduced, the timed metadata may be acquired on the basis of such timed metadata access information.

For example, as illustrated in FIG. 19, parameters such as POSITION and ORIENTATION may be defined in this timed metadata access information. FIG. 20 illustrates semantics of such parameters. As illustrated in FIG. 20, the POSITION is a parameter indicating the position of the camera. More specifically, a reference to an accessor where timed data of the position of the camera (data indicating the position of the camera at each time) becomes available is provided as a value of the POSITION. The ORIENTATION is a parameter indicating the orientation of the camera. More specifically, a reference to an accessor where timed data of the orientation of the camera (data indicating the orientation of the camera at each time) becomes available is provided as a value of the ORIENTATION.

That is, the plurality of parameters defined as the timed metadata access information may include the POSITION indicating the position of the camera and the ORIENTATION indicating the orientation of the camera. Then, when the 3D object content is reproduced, the timed metadata may be acquired on the basis of such timed metadata access information.

Note that, in this timed metadata access information, as illustrated in FIG. 19, PERSPECTIVE may be further defined. As illustrated in FIG. 20, the PERSPECTIVE is a parameter indicating the angle of view and perspective information of the camera. More specifically, a reference to an accessor where timed data of the angle of view and perspective information of the camera (data indicating the angle of view and perspective information of the camera at each time) becomes available is provided as a value of the PERSPECTIVE.

Note that the parameter defined in the timed metadata access information is arbitrarily determined, and a parameter other than the above examples may be defined.

For example, in FIG. 19, the value of the POSITION is set to "0". Therefore, the zeroth element of the array in the accessor object (accessor) is specified. A of FIG. 21 is a diagram illustrating a description example of the accessor object in the scene descriptive file. In a case of the example of A of FIG. 21, the accessor object is configured as an array including an element 141, an element 142, and an element 143. In a case of the example of FIG. 19, the POSITION is associated with the element 141 in A of FIG. 21. This element 141 stores information regarding an area 153 of a buffer view object 152 of a buffer object 1151 illustrated in B of FIG. 21. That is, the POSITION is associated with this area 153.

Similarly, in FIG. 19, the value of the ORIENTATION is set to "1". Therefore, the first element of the array in the accessor object (accessor) is specified. That is, the ORIENTATION is associated with the element 142 of A of FIG. 21, i.e., an area 154 of the buffer view object 152 of the buffer object 1151 illustrated in B of FIG. 21.

Similarly, in FIG. 19, the value of the PERSPECTIVE is set to "2". Therefore, the second element of the array in the accessor object (accessor) is specified. That is, the PERSPECTIVE is associated with the element 143 of A of FIG. 21, i.e., an area 155 of the buffer view object 152 of the buffer object 1151 illustrated in B of FIG. 21.

As illustrated in A of FIG. 22, in MP4 data distributed as the timed metadata, each sample 161 is aligned in the time direction. B of FIG. 22 illustrates an example of syntax of this sample. As illustrated in B of FIG. 22, values of parameters such as position, orientation, and perspective are set for each sample. That is, the values of these parameters may change in the time direction (for each sample).

<Method 1-1>

Note that, as illustrated in the third row from the top of the table of FIG. 16, a single piece of timed camera metadata may be associated with a scene description (method 1-1). For example, in a case of FIG. 19, one MPEG timed camera object is defined in the camera object. With this configuration, the single piece of timed camera metadata can be associated with the scene description.

<Method 1-1-1>

Furthermore, as illustrated in the fourth row from the top of the table of FIG. 16, the values of the plurality of parameters described above may be collectively specified as one vector (method 1-1-1). For example, the values of the three parameters POSITION, ORIENTATION, and PERSPECTIVE described above may be collectively specified as a 11 dimensional vector.

For example, the timed metadata access information may specify an accessor object corresponding to an area of a buffer object to be referenced by the plurality of parameters using one vector. Then, when the 3D object content is reproduced, the timed metadata may be acquired on the basis of such timed metadata access information (that is, using the above-described one vector).

A of FIG. 23 is a diagram illustrating description examples of the camera object and the accessor object in the scene descriptive file. In a case of the example illustrated in A of FIG. 23, SAMPLEDATA is defined instead of the POSITION, the ORIENTATION, and the PERSPECTIVE. This SAMPLEDATA is a parameter that collectively specifies the respective values of the POSITION, the ORIENTATION, and the PERSPECTIVE described above. B of FIG. 23 illustrates semantics of the SAMPLEDATA. For example, when the value of the POSITION is represented by a three-dimensional vector, the value of the ORIENTATION is represented by a four-dimensional vector, and the value of the PERSPECTIVE is represented by a four-dimensional vector, the value of the SAMPLEDATA is represented by a 11 dimensional vector obtained by combining the POSITION, the ORIENTATION, and the PERSPECTIVE. That is, the value of the SAMPLEDATA includes the respective values of the POSITION, the ORIENTATION, and the PERSPECTIVE, and the respective values of the POSITION, the ORIENTATION, and the PERSPECTIVE can be derived from the value of the SAMPLEDATA. Note that, the 11 dimensional vector has not been defined as a type, so that the 11 dimensional vector may be defined in the accessor object as illustrated in A of FIG. 23.

<Method 1-1-2>

Furthermore, as illustrated in the fifth row from the top of the table of FIG. 16, the values of the plurality of parameters described above may be collectively specified as an array (method 1-1-2). For example, the specification may be made using an array having the values of the three parameters POSITION, ORIENTATION, and PERSPECTIVE as elements.

For example, the timed metadata access information may specify an accessor object corresponding to an area of a buffer object to be referenced by the plurality of parameters using an array having an accessor index corresponding to each parameter as an element. Then, when the 3D object content is reproduced, the timed metadata may be acquired on the basis of such timed metadata access information (that is, using the above-described array).

A of FIG. 24 is a diagram illustrating description examples of the camera object and the accessor object in the scene descriptive file. In a case of the example illustrated in A of FIG. 24, the SAMPLEDATA is defined instead of the POSITION, the ORIENTATION, and the PERSPECTIVE. This SAMPLEDATA is a parameter whose value is an array having the respective values of the POSITION, the ORIENTATION, and the PERSPECTIVE as elements. B of FIG. 24 illustrates semantics of the SAMPLEDATA. That is, the respective values of the POSITION, the ORIENTATION, and the PERSPECTIVE are provided as elements of this SAMPLEDATA array. That is, in this case as well, the value of the SAMPLEDATA includes the respective values of the POSITION, the ORIENTATION, and the PERSPECTIVE, and the respective values of the POSITION, the ORIENTATION, and the PERSPECTIVE can be derived from the value of the SAMPLEDATA. Note that the vector array is not defined as a type, so that the vector array may be defined in the accessor object as illustrated in A of FIG. 24.

<Method 1-2>

Figure 25:
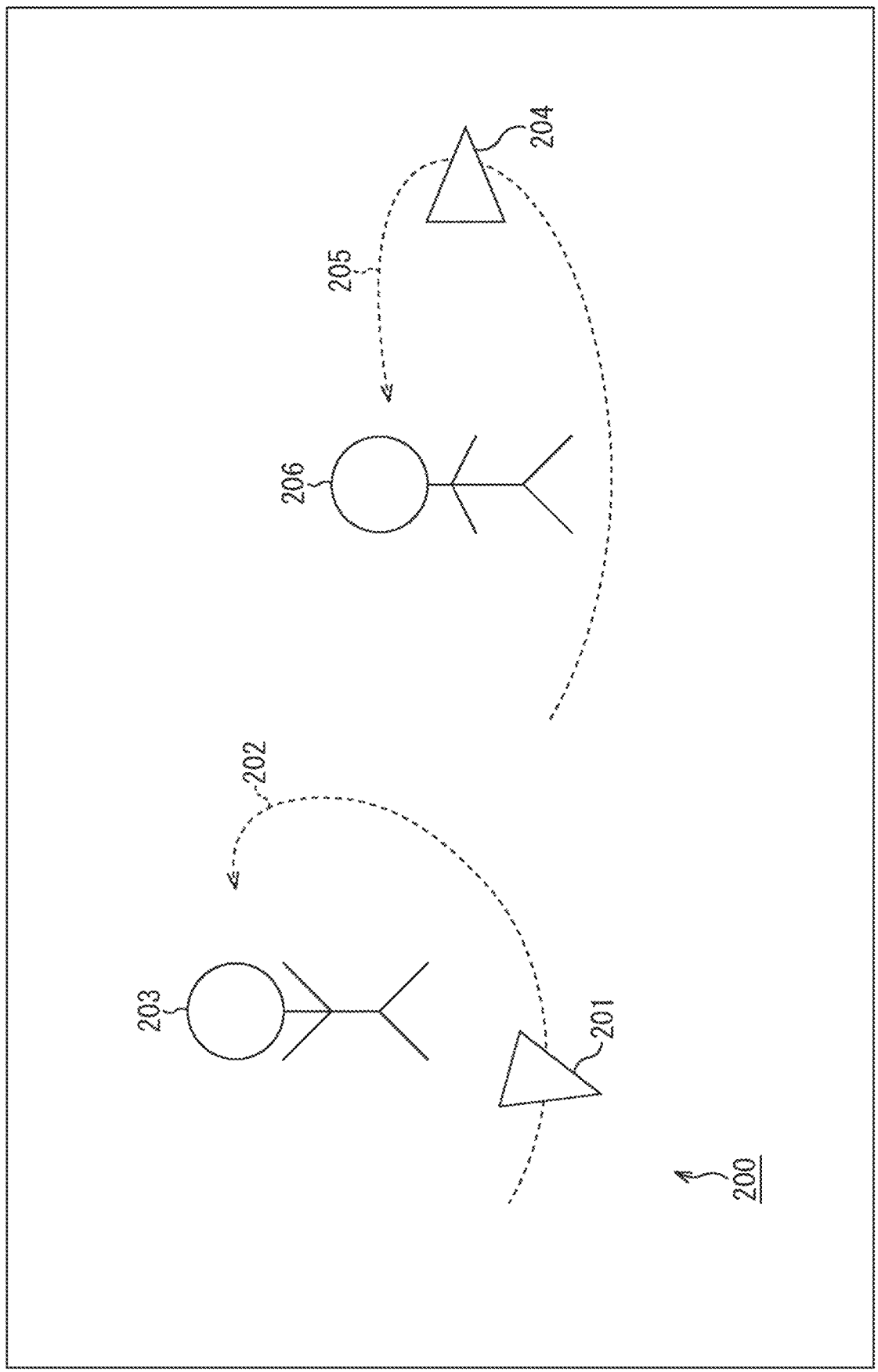
FIG. 25 is a diagram illustrating an example of a plurality of camera objects.

Note that, as illustrated in the sixth row from the top of the table of FIG. 16, a plurality of pieces of timed camera metadata may be associated with the scene description (method 1-2). For example, as illustrated in FIG. 25, a plurality of cameras (a camera 201 and a camera 204) may be set in a three-dimensional space 200, and the timed camera metadata of each camera may be associated with the scene description. In a case of the example of FIG. 25, the camera 201 captures an image of a 3D object 203 while moving as indicated by a dotted arrow 202. The camera 204 captures an image of a 3D object 206 while moving as indicated by a dotted arrow 205.

In such a case, when a method of describing the timed metadata in the scene description is applied, the timed metadata of the camera that is not selected by the user is also transmitted (acquired) together with the scene description.

Associating the timed camera metadata of the plurality of cameras with the scene description as described above allows, when a display image is generated, a viewpoint of the display image to be selected from a plurality of candidates. That is, only necessary data (timed metadata of the camera selected by the user) can be transmitted (acquired).

Note that a method of selecting the camera (timed camera metadata) is arbitrarily determined. For example, the selection may be made by the user or the like, or may be made on the basis of hardware performance of a device that performs the reproduction process.

<Method 1-2-1>

As described above, in a case where the timed camera metadata of the plurality of cameras is associated with the scene description, for example, as illustrated in the seventh row from the top of the table of FIG. 16, a plurality of MPEG media objects may be specified using the timed metadata access information.

For example, the timed metadata access information may specify a plurality of accessor objects corresponding to an area of a buffer object to be referenced. Then, when the 3D object content is reproduced, the timed metadata may be acquired on the basis of such timed metadata access information (that is, using any one of the plurality of specified accessor objects).

A of FIG. 26 is a diagram illustrating a description example of the camera object (MPEG timed camera object) in that case. B of FIG. 26 is a diagram illustrating a description example of the MPEG media object in that case. As illustrated in B of FIG. 26, an MPEG media object 221 and an MPEG media object 222 are set in the MPEG media object. The MPEG media object 221 and the MPEG media object 222 each specify different timed camera metadata. That is, in this case, a plurality of MPEG media objects is prepared.

On the other hand, as illustrated in A of FIG. 26, two MPEG timed camera objects are set in the extension of the camera object. The first MPEG timed camera object specifies the MPEG media object 221, and the second MPEG timed camera object specifies the MPEG media object 222. That is, the plurality of MPEG media objects is (indirectly) associated with the camera object.

That is, the MPEG timed camera objects are defined to be handled as an array, so as to be able to specify the plurality of MPEG media objects. Therefore, each media is allocated to a buffer, and an accessor to each media is referenced from a corresponding MPEG timed camera object (MPEG_timed_ camera object). As each media object, not only a different timed metadata file, but also a different track (track) of the same timed metadata file may be specified.

With this configuration, the timed camera metadata of the plurality of cameras can be associated with the scene description.

<Method 1-2-2>

Furthermore, in a case where the timed camera metadata of the plurality of cameras is associated with the scene description, the MPEG media object may store a plurality of pieces of camera metadata as illustrated in the lowermost row of the table of FIG. 16, for example.

For example, the MPEG media object (MPEG_media extension) may store information regarding a plurality of pieces of timed metadata that changes in time direction as mutually different elements of an alternatives array. Then, when the 3D object content is reproduced, the timed metadata may be acquired on the basis of such timed metadata access information.

A of FIG. 27 is a diagram illustrating a description example of the camera object (MPEG timed camera object) in that case. B of FIG. 27 is a diagram illustrating a description example of the MPEG media object in that case. As illustrated in B of FIG. 27, in the MPEG media object, a timed camera metadata 231 and a timed camera metadata 232 are set using an alternatives array.

On the other hand, as illustrated in A of FIG. 27, one MPEG timed camera object is set in the extension of the camera object.

That is, only one MPEG timed camera object (MPEG_timed_camera object) is stored. Furthermore, the number of media objects in the MPEG media object (MPEG_media) may be one, and a plurality of alternatives objects in the media object may be specified. A name property may be added to each alternatives object to identify the content of the alternatives array and used as an identification label. In the alternatives array, not only mutually different timed metadata files, but also different tracks of the same timed metadata file may be specified.

With this configuration, the timed camera metadata of the plurality of cameras can be associated with the scene description.

3. First Embodiment

<File Generation Device>

Figure 28:
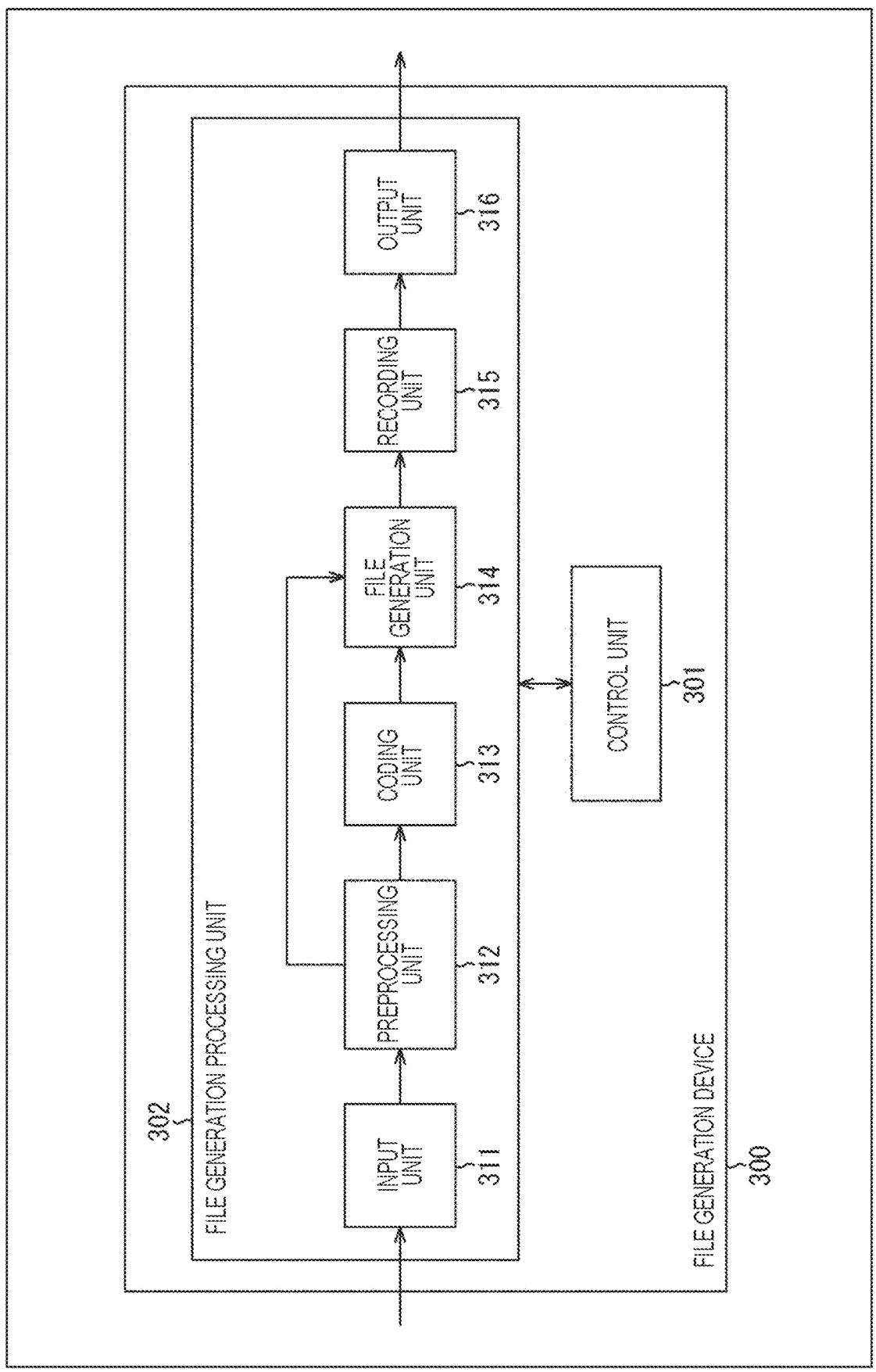
FIG. 28 is a block diagram illustrating a main configuration example of a file generation device.

Each method of the present technology described above is applicable to any device. FIG. 28 is a block diagram illustrating a configuration example of a file generation device that is an aspect of the information processing device to which the present technology is applied. A file generation device 300 illustrated in FIG. 28 is a device that generates information for distribution of 3D object content. For example, the file generation device 300 generates a 3D object content file to be distributed, or generates a scene descriptive file (scene description) of the 3D object content.

Note that FIG. 28 illustrates main processing units, data flows, and the like, and those illustrated in FIG. 28 are not necessarily all. That is, the file generation device 300 may include a processing unit not illustrated as a block in FIG. 28, or may include a process or a data flow not illustrated as an arrow or the like in FIG. 28.

As illustrated in FIG. 28, the file generation device 300 includes a control unit 301 and a file generation processing unit 302. The control unit 301 controls the file generation processing unit 302. The file generation processing unit 302 performs a process regarding file generation under the control of the control unit 301. For example, the file generation processing unit 302 generates a 3D object content file to be distributed. Furthermore, the file generation processing unit 302 generates a scene descriptive file corresponding to the 3D object content file. The file generation processing unit 302 outputs the generated file to the outside of the file generation device 300.

The file generation processing unit 302 includes an input unit 311, a preprocessing unit 312, a coding unit 313, a file generation unit 314, a recording unit 315, and an output unit 316.

The input unit 311 acquires the 3D object content and supplies the 3D object content to the preprocessing unit 312. The preprocessing unit 312 extracts information necessary for file generation from the 3D object content. The preprocessing unit 312 supplies the extracted information to the file generation unit 314. Furthermore, the preprocessing unit 312 supplies the 3D object content to the coding unit 313.

The coding unit 313 codes the 3D object content supplied from the preprocessing unit 312 to generate coded data (bit stream). The coding unit 313 supplies the generated coded data of the 3D object content to the file generation unit 314.

The file generation unit 314 acquires the coded data of the 3D object content supplied from the coding unit 313. Furthermore, the file generation unit 314 acquires the information supplied from the preprocessing unit 312.

The file generation unit 314 generates a 3D object content file that stores the acquired coded data of the 3D object content. The file generation unit 314 generates the file using as needed the information supplied from the preprocessing unit 312. For example, the file generation unit 314 stores the information supplied from the preprocessing unit 312 in the 3D object content file.

Furthermore, the file generation unit 314 generates a scene descriptive file corresponding to the generated 3D object content file. At this time, the file generation unit 314 generates the scene descriptive file by applying the present technology described above in <2. Transmission of timed metadata and the like>. The file generation unit 314 may apply any one or more of the methods of the present technology described above in <2. Transmission of timed metadata and the like>.

For example, the file generation unit 314 generates a scene descriptive file describing a scene of the 3D object content, in the scene descriptive file, timed metadata identification information indicating that metadata of an associated external file changes in the time direction being stored in the MPEG media object (MPEG_media extension), and timed metadata access information that associates the camera object with the metadata in the camera object being stored.

At this time, the file generation unit 314 may store the timed metadata identification information in the mimeType of the alternatives array of the MPEG media object (MPEG_media extension) in the scene descriptive file.

Furthermore, the file generation unit 314 may store the timed metadata access information in the MPEG timed camera object (MPEG_timed_camera extension) of the camera object in the scene descriptive file.

Moreover, for each of a plurality of parameters in the timed metadata access information, the file generation unit 314 may specify an accessor object corresponding to an area of a buffer object to be referenced using an accessor index.

Furthermore, the file generation unit 314 may specify the accessor object corresponding to the area of the buffer object to be referenced using the accessor index for each of POSITION indicating the position of the camera object, ORIENTATION indicating the orientation of the camera object, and PERSPECTIVE indicating the angle of view and perspective information of the camera object as the plurality of parameters.

Moreover, in the timed metadata access information, the file generation unit 314 may specify the accessor object corresponding to the area of the buffer object to be referenced by the plurality of parameters using one vector.

Furthermore, in the timed metadata access information, the file generation unit 314 may specify the accessor object corresponding to the area of the buffer object to be referenced by the plurality of parameters using an array having the accessor index corresponding to each parameter as an element.

Moreover, the file generation unit 314 may specify a plurality of accessor objects corresponding to the area of the buffer object to be referenced in the timed metadata access information.

Furthermore, the file generation unit 314 may store information regarding a plurality of pieces of timed metadata that changes in the time direction as mutually different elements of the alternatives array in the MPEG media object (MPEG_media extension).

The file generation unit 314 supplies the generated file to the recording unit 315. The recording unit 315 includes any recording medium such as a hard disk or a semiconductor memory, for example, and records the file supplied from the file generation unit 314 in the recording medium. Furthermore, the recording unit 315 reads the file recorded in the recording medium in accordance with a request from the control unit 301 or the output unit 316 or at a predetermined timing, and supplies the file to the output unit 316.

The output unit 316 acquires the file supplied from the recording unit 315, and outputs the file to the outside of the file generation device 300 (for example, a distribution server, a reproduction device, or the like).

With such a configuration, the file generation device 300 can associate the timed metadata with the scene description. Therefore, the device that reproduces the 3D object content can easily access the timed metadata on the basis of the timed metadata identification information and the timed metadata access information. Therefore, as described above, the device that reproduces the 3D object content can prevent the reproduction process and the editing process from being complicated and suppress an increase in the load of such processes.

<Flow of File Generation Process>

Figure 29:
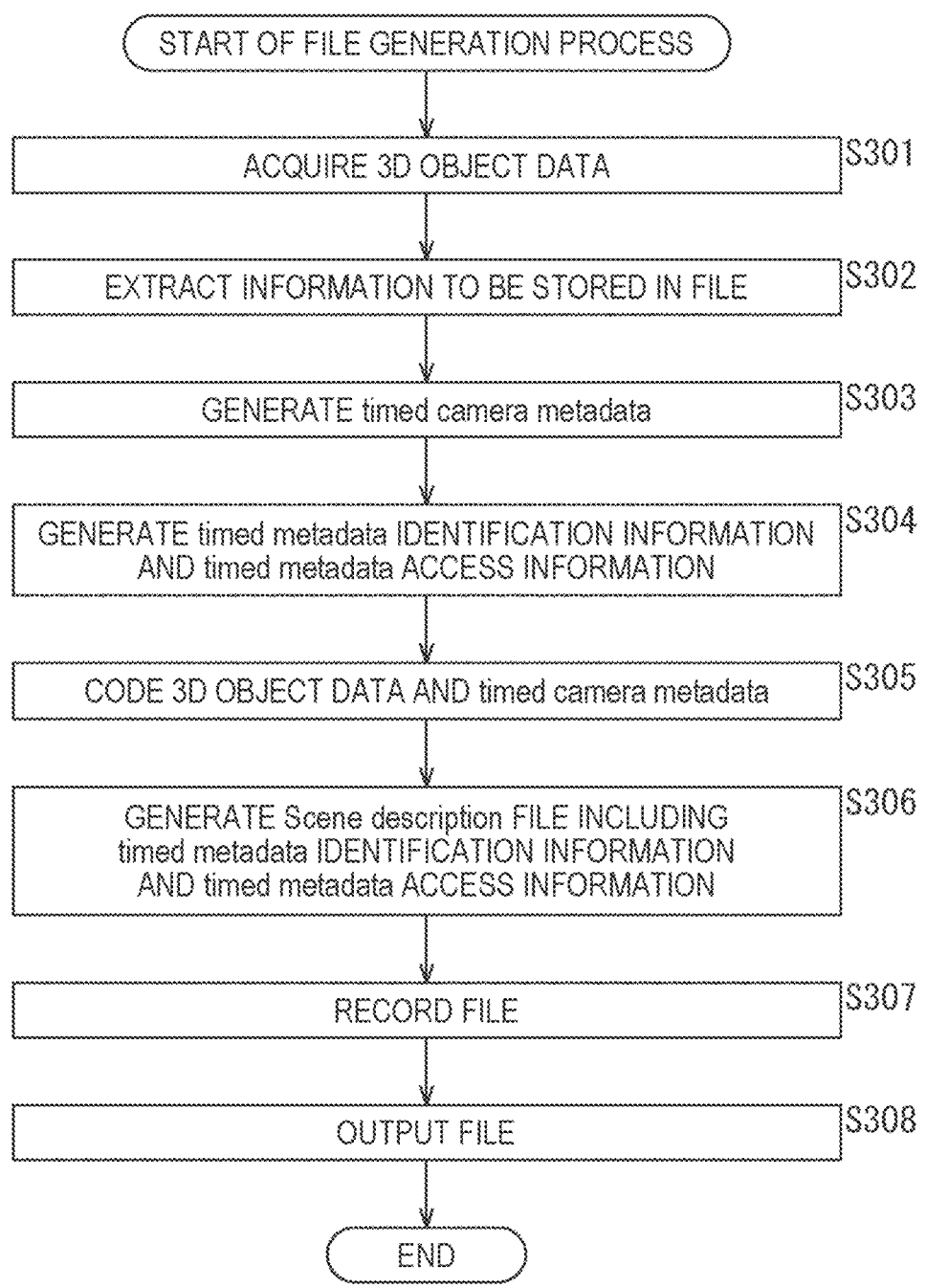
FIG. 29 is a flowchart illustrating an example of a flow of a file generation process.

An example of a flow of a file generation process that is performed by the file generation device 300 of FIG. 28 will be described with reference to a flowchart of FIG. 29.

When the file generation process is started, the input unit 311 of the file generation device 300 acquires a 3D object content that is data of a 3D object in step S301.

In step S302, the preprocessing unit 312 extracts information to be stored in a file from the 3D object content acquired in step S301.

In step S303, the preprocessing unit 312 generates timed camera metadata on the basis of the 3D object content.

In step S304, the preprocessing unit 312 generates timed metadata identification information and timed metadata access information on the basis of the 3D object content.

In step S305, the coding unit 313 codes the 3D object content and the timed camera metadata.

In step S306, the file generation unit 314 generates a scene descriptive file including the timed metadata identification information and the timed metadata access information. Furthermore, the file generation unit 314 generates a file that stores the coded data of the 3D object content. Furthermore, the file generation unit 314 generates a file that stores the coded data of the timed camera metadata. At this time, the file generation unit 314 generates the scene descriptive file by applying the present technology described above in <2. Transmission of timed metadata and the like>. The file generation unit 314 may apply any one or more of the methods of the present technology described above in <2. Transmission of timed metadata and the like>.

For example, the file generation unit 314 generates a scene descriptive file describing a scene of the 3D object content, in the scene descriptive file, timed metadata identification information indicating that metadata of an associated external file changes in the time direction being stored in the MPEG media object (MPEG_media extension), and timed metadata access information that associates the camera object with the metadata in the camera object being stored.

At this time, the file generation unit 314 may store the timed metadata identification information in the mimeType of the alternatives array of the MPEG media object (MPEG_media extension) in the scene descriptive file.

Furthermore, the file generation unit 314 may store the timed metadata access information in the MPEG timed camera object (MPEG_timed_camera extension) of the camera object in the scene descriptive file.

Moreover, for each of a plurality of parameters in the timed metadata access information, the file generation unit 314 may specify an accessor object corresponding to an area of a buffer object to be referenced using an accessor index.

Furthermore, the file generation unit 314 may specify the accessor object corresponding to the area of the buffer object to be referenced using the accessor index for each of POSITION indicating the position of the camera object, ORIENTATION indicating the orientation of the camera object, and PERSPECTIVE indicating the angle of view and perspective information of the camera object as the plurality of parameters.

Moreover, in the timed metadata access information, the file generation unit 314 may specify the accessor object corresponding to the area of the buffer object to be referenced by the plurality of parameters using one vector.

Furthermore, in the timed metadata access information, the file generation unit 314 may specify the accessor object corresponding to the area of the buffer object to be referenced by the plurality of parameters using an array having the accessor index corresponding to each parameter as an element.

Moreover, the file generation unit 314 may specify a plurality of accessor objects corresponding to the area of the buffer object to be referenced in the timed metadata access information.

Furthermore, the file generation unit 314 may store information regarding a plurality of pieces of timed metadata that changes in the time direction as mutually different elements of the alternatives array in the MPEG media object (MPEG_media extension).

In step S307, the recording unit 315 records the file generated in step S306 in the recording medium.

In step S308, the output unit 316 reads the file recorded in step S307 from the recording medium, and outputs the read file to the outside of the file generation device 300 at a predetermined timing.

The end of the process of step S308 brings the file generation process to an end.

As described above, the file generation device 300 can associate the timed metadata with the scene description by performing each process. Therefore, the device that reproduces the 3D object content can easily access the timed metadata on the basis of the timed metadata identification information and the timed metadata access information. Therefore, as described above, the device that reproduces the 3D object content can prevent the reproduction process and the editing process from being complicated and suppress an increase in the load of such processes.

4. Second Embodiment

<Client Device>

Figure 30:
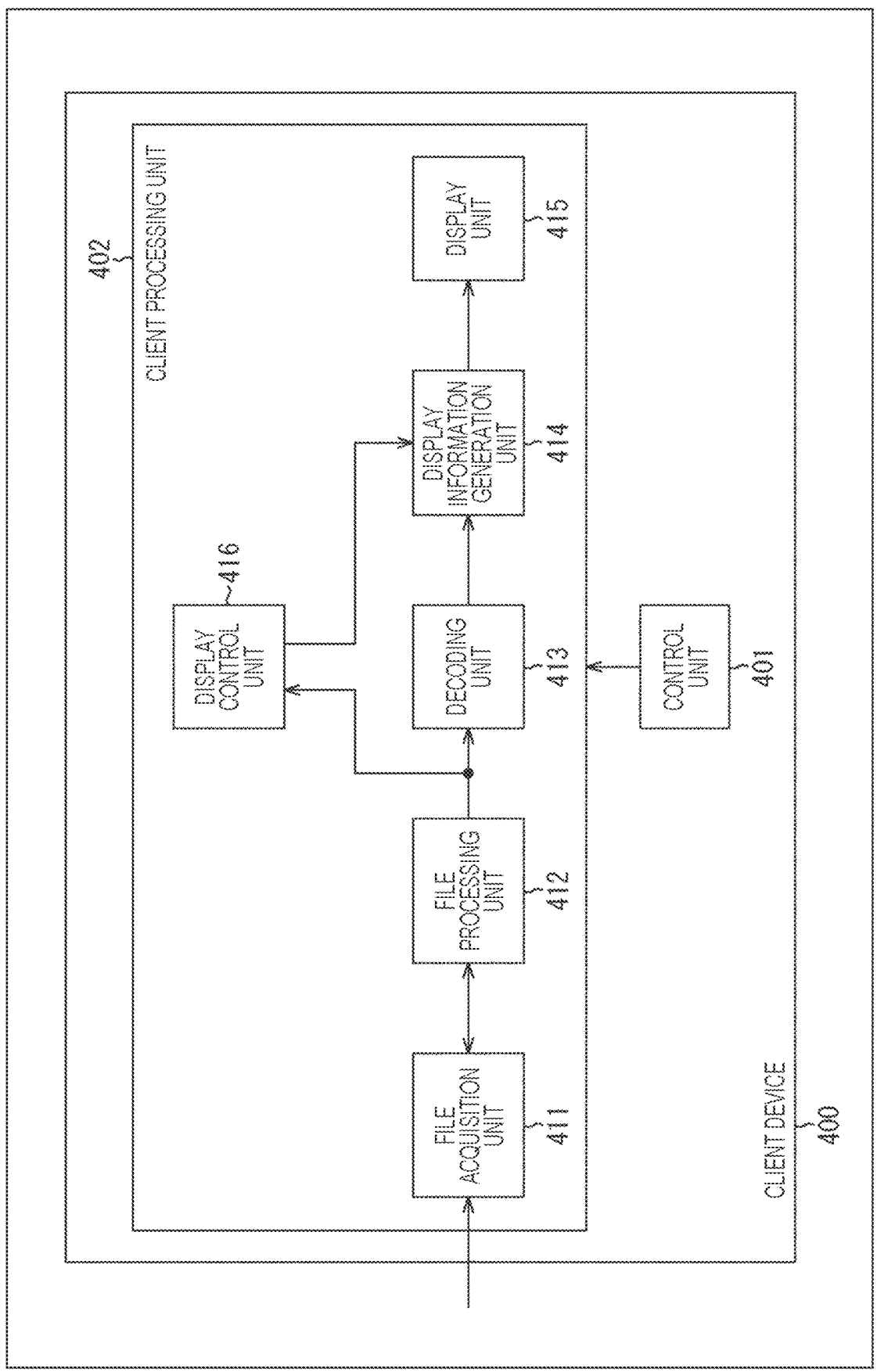
FIG. 30 is a block diagram illustrating a main configuration example of a client device.

FIG. 30 is a block diagram illustrating a configuration example of a client device that is an aspect of the information processing device to which the present technology is applied. A client device 400 illustrated in FIG. 30 is a reproduction device that performs the reproduction process of 3D object content on the basis of the scene descriptive file (scene description). For example, the client device 400 reproduces the 3D object content generated by the file generation device 300 and stored in the 3D object content file. For example, the client device 400 decodes the coded data of the 3D object content stored in the 3D object content file on the basis of the scene descriptive file, performs rendering of the generated 3D object content, and generates and displays a display image.

Note that FIG. 30 illustrates main processing units, data flows, and the like, and those illustrated in FIG. 30 are not necessarily all. That is, the client device 400 may include a processing unit not illustrated as a block in FIG. 30, or may include a process or a data flow not illustrated as an arrow or the like in FIG. 30.

As illustrated in FIG. 30, the client device 400 includes a control unit 401 and a reproduction processing unit 402. The control unit 401 performs a process regarding the control of the reproduction processing unit 402. The reproduction processing unit 402 performs a process regarding the reproduction of the 3D object content stored in the 3D object content file. For example, the reproduction processing unit 402 acquires a scene descriptive file from a distribution server (not illustrated) or the like under the control of the control unit 401. The reproduction processing unit 402 acquires a 3D object content file storing 3D object content to be reproduced on the basis of the scene descriptive file. Then, the reproduction processing unit 402 performs the reproduction process of the 3D object content stored in the acquired 3D object content file.

The reproduction processing unit 402 includes a file acquisition unit 411, a file processing unit 412, a decoding unit 413, a display information generation unit 414, a display unit 415, and a display control unit 416.

The file acquisition unit 411 acquires the scene descriptive file supplied from the outside of the client device 400, for example, a distribution server, the file generation device 300, or the like. The file acquisition unit 411 supplies the acquired scene descriptive file to the file processing unit 412.

Furthermore, the file acquisition unit 411 acquires a 3D object content file or the like that stores 3D object content to be reproduced under the control of the file processing unit 412 using the scene descriptive file. The file acquisition unit 411 supplies the acquired 3D object content file to the file processing unit 412.

The file processing unit 412 acquires the scene descriptive file supplied from the file acquisition unit 411. The file processing unit 412 selects the 3D object content to be reproduced on the basis of the acquired scene descriptive file. Then, the file processing unit 412 controls the file acquisition unit 411 to acquire the 3D object content file that stores the selected 3D object content.

In such a process, the file processing unit 412 applies the present technology described above in <2. Transmission of timed metadata and the like>. The file processing unit 412 may apply any one or more of the methods of the present technology described above in <2. Transmission of timed metadata and the like>.

For example, the file processing unit 412 acquires timed metadata that changes in the time direction on the basis of timed metadata identification information stored in the MPEG media object (MPEG_media extension) in a scene descriptive file describing a scene of the 3D object content and timed metadata access information stored in the camera object in the scene descriptive file, and generates a display image of the 3D object content on the basis of the acquired timed metadata.

At this time, the file processing unit 412 may acquire the timed metadata on the basis of timed metadata identification information stored in the mimeType of the alternatives array of the MPEG media object (MPEG_media extension) in the scene descriptive file.

Furthermore, the file processing unit 412 may acquire the timed metadata on the basis of timed metadata access information stored in the MPEG timed camera object (MPEG_timed_camera extension) of the camera object in the scene descriptive file.

Moreover, for each of a plurality of parameters, the file processing unit 412 may acquire the timed metadata on the basis of timed metadata access information in which an accessor object corresponding to an area of a buffer object to be referenced is specified using an accessor index.

Furthermore, the file processing unit 412 may acquire the timed metadata on the basis of timed metadata access information in which the accessor object corresponding to the area of the buffer object to be referenced is specified using an accessor index for each of POSITION indicating the position of the camera object, ORIENTATION indicating the orientation of the camera object, and PERSPECTIVE indicating the angle of view and perspective information of the camera object as the plurality of parameters.

Moreover, the file processing unit 412 may acquire the timed metadata on the basis of timed metadata access information in which the accessor object corresponding to the area of the buffer object to be referenced by the plurality of parameters is specified using one vector.

Furthermore, the file processing unit 412 may acquire the timed metadata on the basis of timed metadata access information in which the accessor object corresponding to the area of the buffer object to be referenced by the plurality of parameters is specified using an array having the accessor index corresponding to each parameter as an element.

Moreover, the file processing unit 412 may acquire the timed metadata on the basis of timed metadata access information in which a plurality of accessor objects corresponding to the area of the buffer object to be referenced is specified.

Furthermore, the file processing unit 412 may acquire the timed metadata using the MPEG media object (MPEG_media extension) in which information regarding a plurality of pieces of timed metadata that changes in the time direction is stored as mutually different elements of the alternatives array.

The file processing unit 412 supplies the 3D object content file acquired as described above to the decoding unit 413 or the display control unit 416.

The decoding unit 413 decodes the coded data of the 3D object content stored in the 3D object content file supplied from the file processing unit 412. That is, the decoding unit 413 decodes the coded data of the 3D object content selected by the file processing unit 412. The decoding unit 413 supplies the 3D object content obtained by the decoding to the display information generation unit 414.

The display information generation unit 414 acquires the 3D object content supplied from the decoding unit 413. Furthermore, the display information generation unit 414 acquires control information supplied from the display control unit 416. Then, the display information generation unit 414 generates, in accordance with the control information, the display image and the like from the acquired 3D object content. The display information generation unit 414 supplies the generated display image and the like to the display unit 415.

The display unit 415 includes a display device, and displays the display image supplied from the display information generation unit 414 using the display device.

The display control unit 416 acquires information supplied from the file processing unit 412. The display control unit 416 controls the display information generation unit 414 on the basis of the information. The display control unit 416 controls the display of the display image by supplying the control information to the display information generation unit 414.

With such a configuration, the client device 400 can easily access the timed metadata on the basis of the timed metadata identification information and the timed metadata access information. Therefore, as described above, the client device 400 can prevent the reproduction process and the editing process from being complicated and suppress an increase in the load of such processes.

<Client Process Flow 1>

Figure 31:
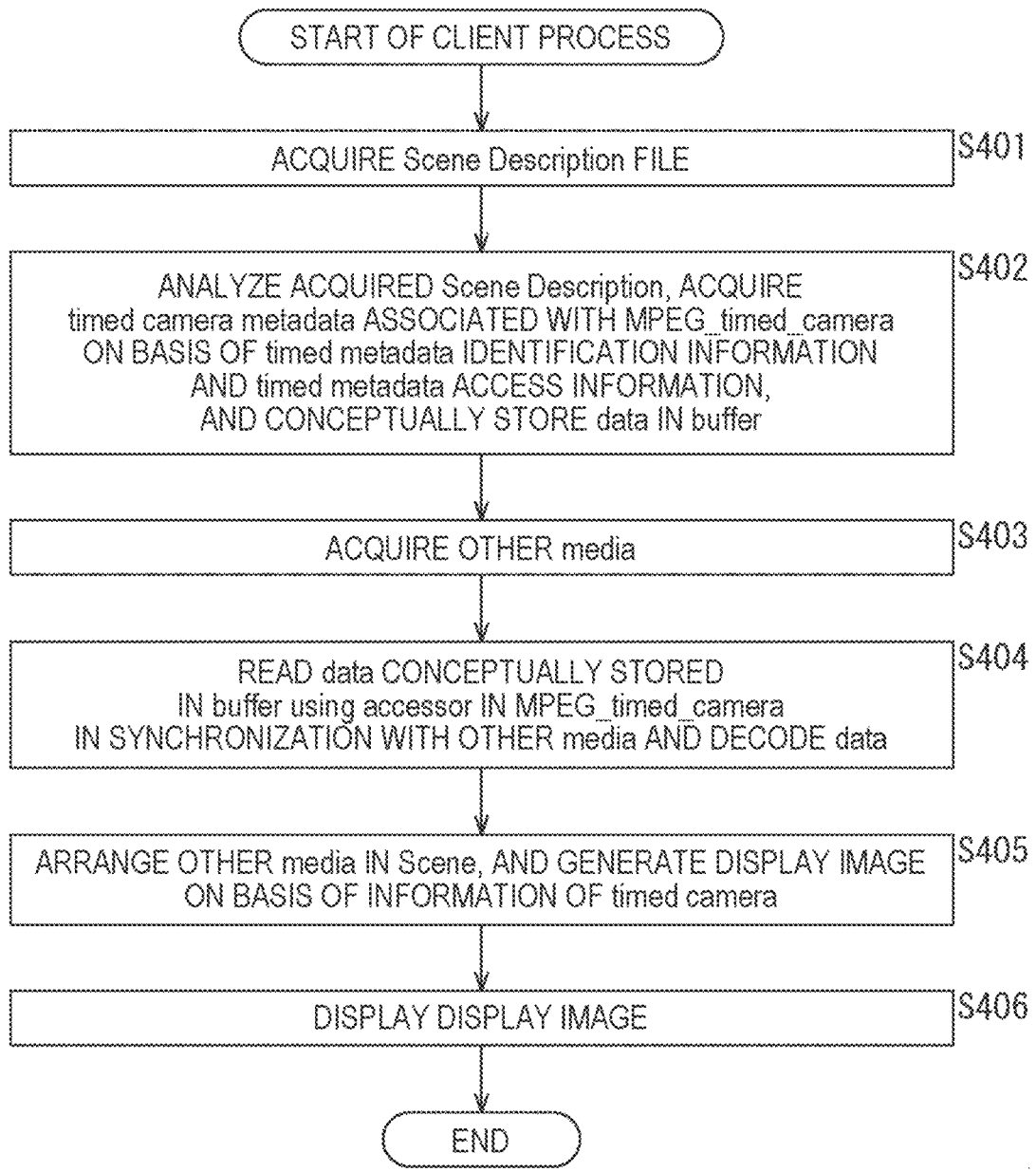
FIG. 31 is a flowchart illustrating an example of a flow of a client process.

An example of a flow of a client process that is performed by the client device 400 of FIG. 30 will be described with reference to a flowchart of FIG. 31. The flowchart illustrated in FIG. 31 is an example of the flow of the client process in a case of Method 1-1 (including the method 1-1-1 and the method 1-1-2).

When the client process is started, the file acquisition unit 411 of the client device 400 acquires a scene descriptive file in step S401.

In step S402, the file processing unit 412 analyzes the scene descriptive file acquired in step S401, acquires timed camera metadata associated with the MPEG timed camera on the basis of timed metadata identification information and timed metadata access information, and conceptually stores the data in a buffer.

For example, the file processing unit 412 acquires timed metadata that changes in the time direction on the basis of timed metadata identification information stored in the MPEG media object (MPEG_media extension) in a scene descriptive file describing a scene of the 3D object content and timed metadata access information stored in the camera object in the scene descriptive file, and generates a display image of the 3D object content on the basis of the acquired timed metadata.

At this time, the file processing unit 412 may acquire the timed metadata on the basis of timed metadata identification information stored in the mimeType of the alternatives array of the MPEG media object (MPEG_media extension) in the scene descriptive file.

Furthermore, the file processing unit 412 may acquire the timed metadata on the basis of timed metadata access information stored in the MPEG timed camera object (MPEG_timed_camera extension) of the camera object in the scene descriptive file.

Moreover, for each of a plurality of parameters, the file processing unit 412 may acquire the timed metadata on the basis of timed metadata access information in which an accessor object corresponding to an area of a buffer object to be referenced is specified using an accessor index.

Furthermore, the file processing unit 412 may acquire the timed metadata on the basis of timed metadata access information in which the accessor object corresponding to the area of the buffer object to be referenced is specified using an accessor index for each of POSITION indicating the position of the camera object, ORIENTATION indicating the orientation of the camera object, and PERSPECTIVE indicating the angle of view and perspective information of the camera object as the plurality of parameters.

Moreover, the file processing unit 412 may acquire the timed metadata on the basis of timed metadata access information in which the accessor object corresponding to the area of the buffer object to be referenced by the plurality of parameters is specified using one vector.

Furthermore, the file processing unit 412 may acquire the timed metadata on the basis of timed metadata access information in which the accessor object corresponding to the area of the buffer object to be referenced by the plurality of parameters is specified using an array having the accessor index corresponding to each parameter as an element.

Moreover, the file processing unit 412 may acquire the timed metadata on the basis of timed metadata access information in which a plurality of accessor objects corresponding to the area of the buffer object to be referenced is specified.

Furthermore, the file processing unit 412 may acquire the timed metadata using the MPEG media object (MPEG_media extension) in which information regarding a plurality of pieces of timed metadata that changes in the time direction is stored as mutually different elements of the alternatives array.

In step S403, the file acquisition unit 411 acquires other media.

In step S404, the file processing unit 412 reads the data conceptually stored in the buffer using an accessor in the MPEG timed camera in synchronization with the other media. The decoding unit 413 decodes the read data such as the coded data of the 3D object content.

In step S405, the display information generation unit 414 arranges the other media in the scene, and generates a display image on the basis of information of the timed camera.

In step S406, the display unit 415 displays the display image.

The end of the process of step S406 brings the client process to an end.

As described above, the client device 400 can easily access, by performing each process, the timed metadata on the basis of the timed metadata identification information and the timed metadata access information. Therefore, as described above, the client device 400 can prevent the reproduction process and the editing process from being complicated and suppress an increase in the load of such processes.

<Client Process Flow 2>

Figure 32:
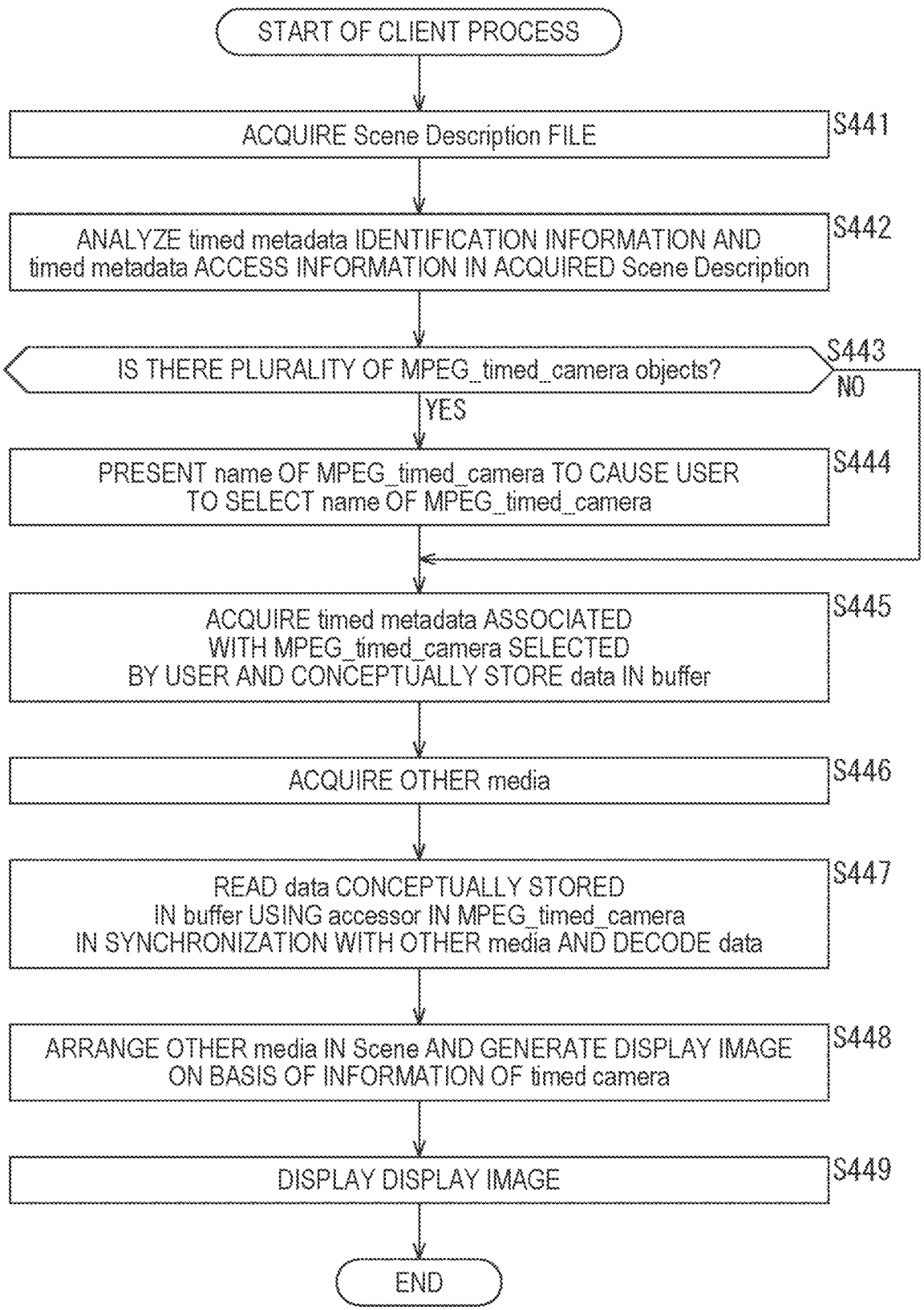
FIG. 32 is a flowchart illustrating an example of a flow of a client process.

An example of the flow of the client process that is performed by the client device 400 of FIG. 30 will be described with reference to a flowchart of FIG. 32. The flowchart illustrated in FIG. 32 is an example of the flow of the client process in a case of the method 1-2-1.

When the client process is started, the file acquisition unit 411 of the client device 400 acquires a scene descriptive file in step S441.

In step S442, the file processing unit 412 analyzes timed metadata identification information and timed metadata access information in the scene descriptive file acquired in step S441.

Then, the file processing unit 412 acquires timed metadata on the basis of the timed metadata identification information and the timed metadata access information. Note that the timed metadata identification information may be stored in the mimeType of the alternatives array of the MPEG media object (MPEG_media extension) in the scene descriptive file. Furthermore, the timed metadata access information may be stored in the MPEG timed camera object (MPEG_timed_camera extension) of the camera object in the scene descriptive file.

In this case, the file processing unit 412 may acquire the timed metadata on the basis of the timed metadata access information in which a plurality of accessor objects corresponding to the area of the buffer object to be referenced is specified. That is, the process is performed as follows.

In step S443, the file processing unit 412 determines whether or not there is a plurality of MPEG timed camera objects on the basis of a result of the analysis in step S442. That is, the file processing unit 412 determines whether or not a plurality of accessor objects is specified in the timed metadata access information. In a case where it is determined that there is a plurality of MPEG timed camera objects (that is, a plurality of accessor objects is specified in the timed metadata access information) as in the example of A of FIG. 26, the process proceeds to step S444.

In step S444, the file processing unit 412 presents a name of the MPEG timed camera to cause the user to select the name of the MPEG timed camera. After the end of the process of step S444, the process proceeds to step S445. Furthermore, in a case where it is determined in step S443 that there is a single MPEG timed camera, the process proceeds to step S445.

In step S445, the file acquisition unit 411 acquires the timed metadata associated with the MPEG timed camera selected by the user in step S444 or the timed metadata associated with the single MPEG timed camera, and conceptually stores the data in a buffer.

At this time, for each of a plurality of parameters, the file processing unit 412 may acquire the timed metadata on the basis of timed metadata access information in which an accessor object corresponding to the area of the buffer object to be referenced is specified using an accessor index.

Furthermore, the file processing unit 412 may acquire the timed metadata on the basis of timed metadata access information in which the accessor object corresponding to the area of the buffer object to be referenced is specified using an accessor index for each of POSITION indicating the position of the camera object, ORIENTATION indicating the orientation of the camera object, and PERSPECTIVE indicating the angle of view and perspective information of the camera object as the plurality of parameters.

Moreover, the file processing unit 412 may acquire the timed metadata on the basis of timed metadata access information in which the accessor object corresponding to the area of the buffer object to be referenced by the plurality of parameters is specified using one vector.

Furthermore, the file processing unit 412 may acquire the timed metadata on the basis of timed metadata access information in which the accessor object corresponding to the area of the buffer object to be referenced by the plurality of parameters is specified using an array having the accessor index corresponding to each parameter as an element.

The respective processes of steps S446 to S449 are performed in a similar manner to the respective processes of steps S403 to S406 of FIG. 31. The end of the process of step S449 brings the client process to an end.

As described above, the client device 400 can easily access, by performing each process, the timed metadata on the basis of the timed metadata identification information and the timed metadata access information. Therefore, as described above, the client device 400 can prevent the reproduction process and the editing process from being complicated and suppress an increase in the load of such processes.

<Client Process Flow 3>

Figure 33:
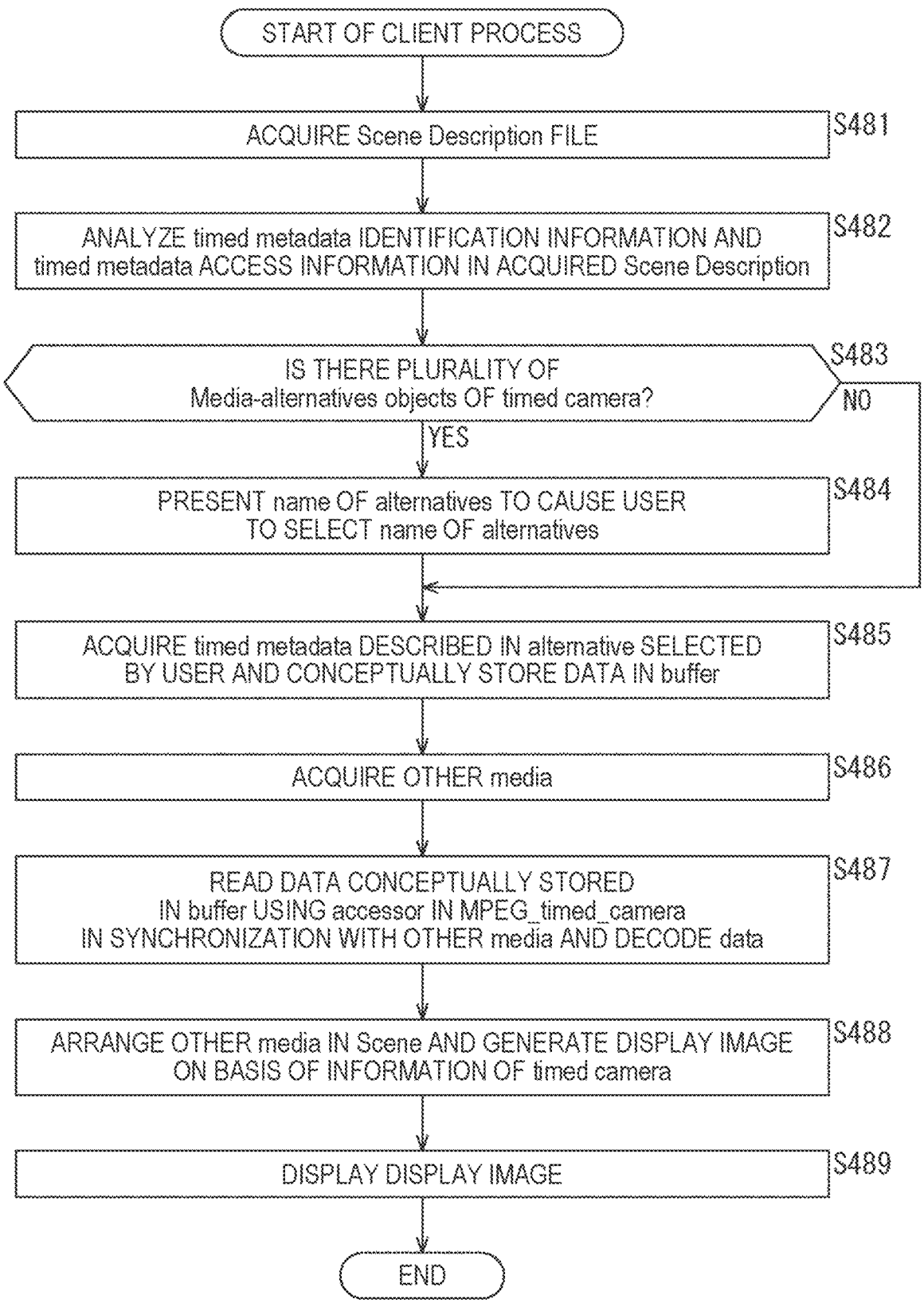
FIG. 33 is a flowchart illustrating an example of a flow of a client process.

An example of the flow of the client process that is performed by the client device 400 of FIG. 30 will be described with reference to a flowchart of FIG. 33. The flowchart illustrated in FIG. 33 is an example of the flow of the client process in a case of the method 1-2-2.

When the client process is started, the file acquisition unit 411 of the client device 400 acquires a scene descriptive file in step S481.

In step S482, the file processing unit 412 analyzes timed metadata identification information and timed metadata access information in the scene descriptive file acquired in step S481.

Then, the file processing unit 412 acquires timed metadata on the basis of the timed metadata identification information and the timed metadata access information. Note that the timed metadata identification information may be stored in the mimeType of the alternatives array of the MPEG media object (MPEG_media extension) in the scene descriptive file. Furthermore, the timed metadata access information may be stored in the MPEG timed camera object (MPEG_timed_camera extension) of the camera object in the scene descriptive file.

In this case, the file processing unit 412 may acquire the timed metadata using the MPEG media object (MPEG_media extension) that stores information regarding a plurality of pieces of timed metadata that changes in the time direction as mutually different elements of the alternatives array. That is, the process is performed as follows.

In step S483, the file processing unit 412 determines whether or not there is a plurality of media alternatives objects of the timed camera on the basis of a result of the analysis in step S482. That is, the file processing unit 412 determines whether or not the MPEG media object stores the information regarding the plurality of pieces of timed metadata as mutually different elements of the alternatives array. As in the example of B of FIG. 27, in a case where it is determined that there is a plurality of pieces of timed camera metadata specified in the MPEG media object, the process proceeds to step S484.

In step S484, the file processing unit 412 presents the name of each element of the alternatives array to cause the user to select the name of the element of the alternatives array. That is, the file processing unit 412 causes the user to select timed metadata (timed camera metadata). After the end of the process of step S484, the process proceeds to step S485. Furthermore, in a case where it is determined in step S483 that there is a single media alternatives object of the timed camera, the process proceeds to step S485.

In step S485, the file acquisition unit 411 acquires the timed metadata selected by the user in step S484 or the single timed metadata, and conceptually stores the data in the buffer.

At this time, for each of a plurality of parameters, the file processing unit 412 may acquire the timed metadata on the basis of timed metadata access information in which an accessor object corresponding to the area of the buffer object to be referenced is specified using an accessor index.

Furthermore, the file processing unit 412 may acquire the timed metadata on the basis of timed metadata access information in which the accessor object corresponding to the area of the buffer object to be referenced is specified using an accessor index for each of POSITION indicating the position of the camera object, ORIENTATION indicating the orientation of the camera object, and PERSPECTIVE indicating the angle of view and perspective information of the camera object as the plurality of parameters.

Moreover, the file processing unit 412 may acquire the timed metadata on the basis of timed metadata access information in which the accessor object corresponding to the area of the buffer object to be referenced by the plurality of parameters is specified using one vector.

Furthermore, the file processing unit 412 may acquire the timed metadata on the basis of timed metadata access information in which the accessor object corresponding to the area of the buffer object to be referenced by the plurality of parameters is specified using an array having the accessor index corresponding to each parameter as an element.

The respective processes of steps S486 to S489 are performed in a similar manner to the respective processes of steps S403 to S406 of FIG. 31. The end of the process of step S489 brings the client process to an end.

As described above, the client device 400 can easily access, by performing each process, the timed metadata on the basis of the timed metadata identification information and the timed metadata access information. Therefore, as described above, the client device 400 can prevent the reproduction process and the editing process from being complicated and suppress an increase in the load of such processes.

5. Appendix

<Computer>

The above-described series of processes can be performed by hardware or software. In a case where the series of processes is performed by software, a program constituting the software is installed on a computer. Here, examples of the computer include a computer incorporated into dedicated hardware, a general-purpose personal computer capable of performing various functions in accordance with various programs installed on the general-purpose personal computer, and the like.

Figure 34:
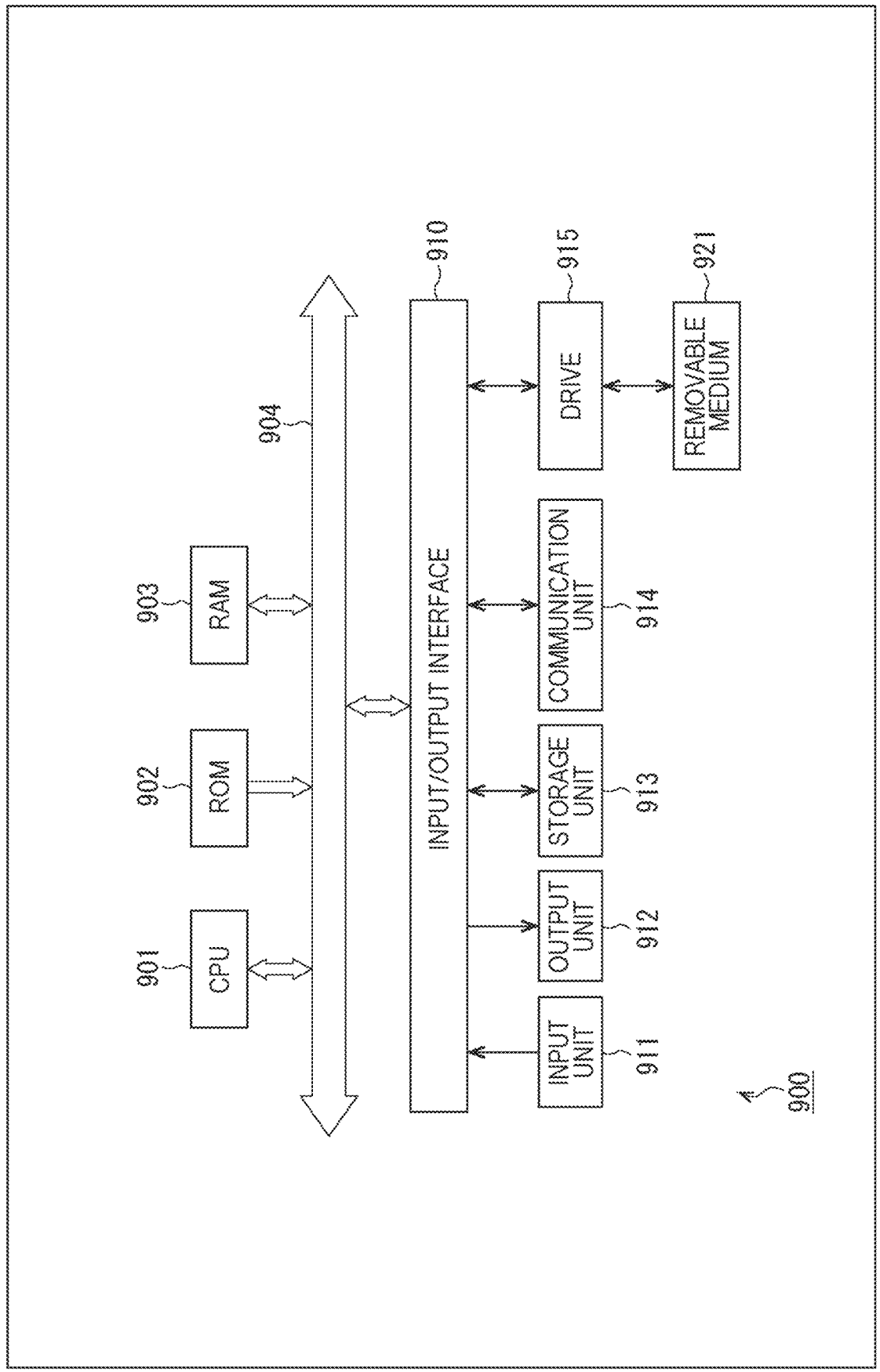
FIG. 34 is a block diagram illustrating a main configuration example of a computer.

FIG. 34 is a block diagram illustrating a configuration example of hardware of a computer that performs the above-described series of processes in accordance with a program.

In a computer 900 illustrated in FIG. 34, a central processing unit (CPU) 901, a read only memory (ROM) 902, and a random access memory (RAM) 903 are mutually connected over a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touchscreen, an input terminal, or the like. The output unit 912 include, for example, a display, a speaker, an output terminal, or the like. The storage unit 913 include, for example, a hard disk, a RAM disk, a nonvolatile memory, or the like. The communication unit 914 includes, for example, a network interface. The drive

915 drives a removable medium 921 such as a magnetic disk, an optical disc, a magneto-optical disk, or a semiconductor memory.

In the computer configured as described above, for example, the CPU 901 performs the above-described series of processes by loading a program stored in the storage unit 913 onto the RAM 903 via the input/output interface 910 and the bus 904 and running the program. The RAM 903 further stores, as needed, data and the like necessary for the CPU 901 to perform various processes.

The program run by the computer is applicable with the program recorded in the removable medium 921 that serves as a package medium or the like, for example. In this case, attaching the removable medium 921 to the drive 915 allows the program to be installed on the storage unit 913 via the input/output interface 910.

Furthermore, this program can also be provided via a wired or wireless transmission medium such as a local area network, the Internet, or digital satellite broadcasting. In this case, the program can be received by the communication unit 914 and installed on the storage unit 913.

Alternatively, this program can be preinstalled on the ROM 902 or the storage unit 913.

<Object to which the Present Technology is Applicable>

The present technology is applicable to any image coding/decoding method.

Furthermore, the present technology is applicable to any configuration. For example, the present technology may be applied to various electronic devices.

Furthermore, for example, the present technology can also be implemented as a configuration of a part of a device, such as a processor (for example, a video processor) as system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology is also applicable to a network system including a plurality of devices. For example, the present technology may be implemented as cloud computing shared and processed in cooperation among a plurality of devices over a network. For example, the present technology may be implemented in a cloud service that provides a service related to images (moving images) to any terminal such as a computer, audio visual (AV) equipment, a portable information processing terminal, or an Internet of Things (IoT) device.

Note that, herein, a system means a set of a plurality of components (devices, modules (parts), etc.), regardless of whether or not all the components are in the same housing. Therefore, a plurality of devices housed in separate housings and connected over a network, and one device in which a plurality of modules is housed in one housing are both systems.

<Field and Use to which Present Technology is Applicable>

A system, a device, a processing unit, or the like to which the present technology is applied can be used in any field such as traffic, medical, crime prevention, agriculture, stockbreeding, mining, beauty, factory, home appliance, weather, natural monitoring, or the like. Furthermore, its use is also arbitrarily determined.

For example, the present technology is applicable to a system or a device used for providing content for appreciation or the like. Furthermore, for example, the present technology is also applicable to a system or a device used for traffic, such as traffic condition supervision or automated driving control. Moreover, for example, the present technology is also applicable to a system or a device used for security. Furthermore, for example, the present technology is applicable to a system or a device used for automated control of a machine or the like. Moreover, for example, the present technology is also applicable to a system or a device used for agriculture or stockbreeding. Furthermore, the present technology is also applicable to a system or a device that monitors a natural condition such as a volcano, a forest, or an ocean, wildlife, or the like. Moreover, for example, the present technology is also applicable to a system or a device used for sports.

<Others>

Note that, herein, a "flag" is information for identifying each of a plurality of states, and includes not only information used for identifying one of two states of true (1) and false (0) but also information that makes each of three or more states identifiable. Therefore, a value that can be taken by the "flag" may be, for example, a binary value of 1 or 0 or a ternary value or larger. That is, this "flag" has any bit length, and the bit length may be one bit or a plurality of bits. Furthermore, the identification information (including the flag) is assumed to include not only identification information included in a bit stream but also difference information of the identification information relative to certain reference information included in a bit stream, so that, herein, the "flag" or the "identification information" includes not only the information but also the difference information relative to the reference information.

Furthermore, various types of information (metadata and the like) regarding coded data (bit stream) may be transmitted or recorded in any form as long as the information is associated with the coded data. Here, the term "associate" means, for example, that, when one data is processed, the other data is usable (linkable). That is, pieces of data associated with each other may be put together as one data or may be separate pieces of data. For example, the information associated with the coded data (image) may be transmitted on a transmission path different from a transmission path for the coded data (image). Furthermore, for example, the information associated with the coded data (image) may be recorded in a recording medium different from a recording medium for the coded data (image) (or in a recording area of the same recording medium different from a recording area for the coded data (image)). Note that this "association" may be applied to a part of data rather than all data. For example, an image and information corresponding to the image may be associated with each other in any unit such as a plurality of frames, one frame, or a part in a frame.

Note that, herein, terms such as "combine", "multiplex", "add", "integrate", "include", "store", "put in", "embed", and "insert" mean to combine a plurality of objects into one, for example, to combine coded data and metadata into one data, and mean one method of the above-described "associate".

Furthermore, the embodiments of the present technology are not limited to the above-described embodiments, and various modifications may be made without departing from the gist of the present technology.

For example, a configuration described as one device (or processing unit) may be divided and configured as a plurality of devices (or processing units). Conversely, a configuration described above as a plurality of devices (or processing units) may be collectively configured as one device (or processing unit). Furthermore, a configuration other than the above-described configurations may be added to a configuration of each device (or each processing unit). Moreover, as long as an overall system configuration or operation is substantially the same, a part of a configuration of a certain device (or processing unit) may be included in a configuration of another device (or another processing unit).

Furthermore, for example, the above-described program may be run by any device. In that case, it is only required that the device have a necessary function (functional block or the like) and be capable of acquiring necessary information.

Furthermore, for example, each step of one flowchart may be performed by one device, or may be shared and performed by a plurality of devices. Moreover, in a case where a plurality of processes is included in one step, the plurality of processes may be performed by one device, or may be shared and performed by a plurality of devices. In other words, the plurality of processes included in one step can also be performed as processes of a plurality of steps. Conversely, the processes described as a plurality of steps can be collectively performed as one step.

Furthermore, for example, the program run by the computer may cause processes of steps describing the program to be performed in time series in the order described herein, or to cause the processes to be performed in parallel or individually at a required timing such as when a corresponding process is called. That is, as long as there is no contradiction, the process of each step may be performed in an order different from the above-described order. Moreover, the processes of steps describing this program may be performed in parallel with processes of other program, or may be performed in combination with the processes of the other program.

Furthermore, for example, a plurality of technologies related to the present technology can be each implemented independently as a single technology as long as there is no contradiction. Needless to say, a plurality of any present technologies can be implemented in combination. For example, some or all of the present technology described in any of the embodiments can be implemented in combination with some or all of the present technology described in another embodiment. Furthermore, some or all of the above-described any present technology can be implemented in combination with another technology not described above.

Note that the present technology can also have the following configurations.

(1) An information processing device including a file generation unit configured to generate a scene descriptive file describing a scene of 3D object content, in which in the scene descriptive file, timed metadata identification information indicating that metadata of an associated external file changes in a time direction is stored in an MPEG_media extension, and timed metadata access information associating a camera object with the metadata is stored in the camera object.

(2) The information processing device according to (1), in which in the scene descriptive file, the timed metadata identification information is stored in a mimeType of an alternatives array of the MPEG_media extension.

(3) The information processing device according to (1) or (2), in which in the scene descriptive file, the timed metadata access information is stored in an MPEG_timed_camera extension of the camera object.

(4) The information processing device according to (3), in which the timed metadata access information specifies an accessor object corresponding to an area of a buffer object to be referenced using an accessor index for each of a plurality of parameters.

(5) The information processing device according to (4), in which the plurality of parameters includes POSITION indicating a position of the camera object, ORIENTATION indicating an orientation of the camera object, and PERSPECTIVE indicating an angle of view and perspective information of the camera object.

(6) The information processing device according to (4) or (5), in which the timed metadata access information specifies an accessor object corresponding to an area of a buffer object to be referenced by the plurality of parameters using one vector.

(7) The information processing device according to (4) or (5), in which the timed metadata access information specifies an accessor object corresponding to an area of a buffer object to be referenced by the plurality of parameters using an array having the accessor index corresponding to each parameter as an element.

(8) The information processing device according to any one of (3) to (7), in which the timed metadata access information specifies a plurality of accessor objects corresponding to an area of a buffer object to be referenced.

(9) The information processing device according to any one of (1) to (7), in which the MPEG_media extension stores information regarding a plurality of pieces of timed metadata that changes in the time direction as mutually different elements of an alternative array.

(10) An information processing method including generating a scene descriptive file describing a scene of 3D object content, in which in the scene descriptive file, timed metadata identification information indicating that metadata of an associated external file changes in a time direction is stored in an MPEG_media extension, and timed metadata access information associating a camera object with the metadata is stored in the camera object.

(11) An information processing device including an acquisition unit configured to acquire timed metadata that changes in a time direction on the basis of timed metadata identification information stored in an MPEG_media extension in a scene descriptive file describing a scene of 3D object content and timed metadata access information stored in a camera object in the scene descriptive file, and a generation unit configured to generate a display image of the 3D object content on the basis of the timed metadata acquired by the acquisition unit.

(12) The information processing device according to (11), in which the acquisition unit acquires the timed metadata on the basis of the timed metadata identification information stored in a mimeType of an alternatives array of the MPEG_media extension in the scene descriptive file.

(13) The information processing device according to (11) or (12), in which the acquisition unit acquires the timed metadata on the basis of the timed metadata access information stored in an MPEG_timed_camera extension of the camera object in the scene descriptive file.

(14) The information processing device according to (13), in which the acquisition unit acquires the timed metadata on the basis of the timed metadata access information specifying an accessor object corresponding to an area of a buffer object to be referenced using an accessor index for each of a plurality of parameters.

(15) The information processing device according to (14), in which the acquisition unit acquires the timed metadata on the basis of the timed metadata access information specifying an accessor object corresponding to an area of a buffer object to be referenced using an accessor index for each of POSITION indicating a position of the camera object, ORIENTATION indicating an orientation of the camera object, and PERSPECTIVE indicating an angle of view and perspective information of the camera object.

(16) The information processing device according to (14) or (15), in which the acquisition unit acquires the timed metadata on the basis of the timed metadata access information specifying an accessor object corresponding to an area of a buffer object to be referenced by the plurality of parameters using one vector.

(17) The information processing device according to (14) or (15), in which the acquisition unit acquires the timed metadata on the basis of the timed metadata access information specifying an accessor object corresponding to an area of a buffer object to be referenced by the plurality of parameters using an array having the accessor index corresponding to each parameter as an element.

(18) The information processing device according to any one of (13) to (17), in which the acquisition unit acquires the timed metadata on the basis of the timed metadata access information specifying a plurality of accessor objects corresponding to an area of a buffer object to be referenced.

(19) The information processing device according to any one of (11) to (17), in which the acquisition unit acquires any one of a plurality of pieces of information regarding the timed metadata that changes in the time direction, the plurality of pieces of information being stored in the MPEG_media extension as mutually different elements of an alternative array.

(20) An information processing method including acquiring timed metadata that changes in a time direction on the basis of timed metadata identification information stored in an MPEG_media extension in a scene descriptive file describing a scene of 3D object content and timed metadata access information stored in a camera object in the scene descriptive file, and generating a display image of the 3D object content on the basis of the timed metadata acquired.

REFERENCE SIGNS LIST

300 File generation device
301 Control unit
302 File generation processing unit
311 Input unit
312 Preprocessing unit
313 Coding unit
314 File generation unit
315 Recording unit
316 Output unit
400 Client device
401 Control unit
402 Client processing unit
411 File acquisition unit
412 File processing unit
413 Decoding unit
414 Display information generation unit
415 Display unit
416 Display control unit

The invention claimed is:

1. An information processing device comprising:
circuitry configured to generate a scene descriptive file describing a scene of 3D object content, wherein in the scene descriptive file, timed metadata identification information indicating that metadata of an associated external file changes in a time direction is stored in an MPEG_media extension, and timed metadata access information associating a camera object with the metadata is stored in the camera object, wherein
in the scene descriptive file, the timed metadata access information is stored in an MPEG_timed_camera extension of the camera object and specifies an accessor object corresponding to an area of a buffer object to be referenced using an accessor index for each of a plurality of parameters.

2. The information processing device according to claim 1, wherein
in the scene descriptive file, the timed metadata identification information is stored in a mimeType of an alternatives array of the MPEG_media extension.

3. The information processing device according to claim 1, wherein
the plurality of parameters includes POSITION indicating a position of the camera object, ORIENTATION indicating an orientation of the camera object, and PERSPECTIVE indicating an angle of view and perspective information of the camera object.

4. The information processing device according to claim 1, wherein
the timed metadata access information specifies an accessor object corresponding to an area of a buffer object to be referenced by the plurality of parameters using one vector.

5. The information processing device according to claim 1, wherein
the timed metadata access information specifies an accessor object corresponding to an area of a buffer object to be referenced by the plurality of parameters using an array having the accessor index corresponding to each parameter as an element.

6. The information processing device according to claim 1, wherein
the timed metadata access information specifies a plurality of accessor objects corresponding to an area of a buffer object to be referenced.

7. The information processing device according to claim 1, wherein
the MPEG_media extension stores information regarding a plurality of pieces of timed metadata that changes in the time direction as mutually different elements of an alternative array.

8. An information processing method comprising:
generating a scene descriptive file describing a scene of 3D object content, wherein in the scene descriptive file, timed metadata identification information indicating that metadata of an associated external file changes in a time direction is stored in an MPEG_media extension, and timed metadata access information associating a camera object with the metadata is stored in the camera object, wherein
in the scene descriptive file, the timed metadata access information is stored in an MPEG_timed_camera extension of the camera object and specifies an accessor object corresponding to an area of a buffer object to be referenced using an accessor index for each of a plurality of parameters.

9. An information processing device comprising:
circuitry configured to
acquire timed metadata that changes in a time direction on a basis of timed metadata identification information stored in an MPEG_media extension in a scene descriptive file describing a scene of 3D object content and timed metadata access information stored in a camera object in the scene descriptive file; and
generate a display image of the 3D object content on a basis of the timed metadata, wherein
the circuitry is configured to acquire the timed metadata on a basis of the timed metadata access information stored in an MPEG_timed_camera extension of the camera object in the scene descriptive file, the timed metadata access information specifying an accessor object corresponding to an area of a buffer object to be referenced using an accessor index for each of a plurality of parameters.

10. The information processing device according to claim 9, wherein
the circuitry is configured to acquire the timed metadata on a basis of the timed metadata identification information stored in a mimeType of an alternatives array of the MPEG_media extension in the scene descriptive file.

11. The information processing device according to claim 9, wherein
the circuitry is configured to acquire the timed metadata on a basis of the timed metadata access information specifying an accessor object corresponding to an area of a buffer object to be referenced using an accessor index for each of POSITION indicating a position of the camera object, ORIENTATION indicating an orientation of the camera object, and PERSPECTIVE indicating an angle of view and perspective information of the camera object.

12. The information processing device according to claim 9, wherein
the circuitry is configured to acquire the timed metadata on a basis of the timed metadata access information specifying an accessor object corresponding to an area of a buffer object to be referenced by the plurality of parameters using one vector.

13. The information processing device according to claim 9, wherein
the circuitry is configured to acquire the timed metadata on a basis of the timed metadata access information specifying an accessor object corresponding to an area of a buffer object to be referenced by the plurality of parameters using an array having the accessor index corresponding to each parameter as an element.

14. The information processing device according to claim 9, wherein
the circuitry is configured to acquire the timed metadata on a basis of the timed metadata access information specifying a plurality of accessor objects corresponding to an area of a buffer object to be referenced.

15. The information processing device according to claim 9, wherein
the circuitry is configured to acquire any one of a plurality of pieces of information regarding the timed metadata that changes in the time direction, the plurality of pieces of information being stored in the MPEG_media extension as mutually different elements of an alternative array.

16. An information processing method comprising:
acquiring timed metadata that changes in a time direction on a basis of timed metadata identification information stored in an MPEG_media extension in a scene descriptive file describing a scene of 3D object content and timed metadata access information stored in a camera object in the scene descriptive file; and
generating a display image of the 3D object content on a basis of the timed metadata acquired, wherein
the acquiring includes acquiring the timed metadata on a basis of the timed metadata access information stored in an MPEG_timed_camera extension of the camera object in the scene descriptive file, the timed metadata access information specifying an accessor object corresponding to an area of a buffer object to be referenced using an accessor index for each of a plurality of parameters.

* * * * *